(12) United States Patent
Woo et al.

(10) Patent No.: US 10,539,841 B2
(45) Date of Patent: *Jan. 21, 2020

(54) LIQUID CRYSTAL DISPLAY DEVICE

(71) Applicant: Samsung Display Co. Ltd., Yongin (KR)

(72) Inventors: Su Wan Woo, Osan-si (KR); Min Wook Park, Asan-si (KR); Young Goo Song, Asan-si (KR); Ki Chul Shin, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,141

(22) Filed: Aug. 13, 2018

(65) Prior Publication Data
US 2018/0348582 A1 Dec. 6, 2018

Related U.S. Application Data

(63) Continuation of application No. 15/712,885, filed on Sep. 22, 2017, now Pat. No. 10,048,549, which is a
(Continued)

(30) Foreign Application Priority Data

Feb. 23, 2015 (KR) .......................... 10-2015-0025398

(51) Int. Cl.
*G02F 1/1343* (2006.01)
*G02F 1/1362* (2006.01)
*G02F 1/1337* (2006.01)

(52) U.S. Cl.
CPC .. *G02F 1/134336* (2013.01); *G02F 1/133707* (2013.01); *G02F 1/136213* (2013.01);
(Continued)

(58) Field of Classification Search
CPC ... G02F 1/136213; G02F 2001/134345; G02F 2001/134354; G02F 1/134336; G02F 1/133707; G02F 2001/133761
See application file for complete search history.

(56) References Cited

U.S. PATENT DOCUMENTS 7,880,845 B2 2/2011 Lee et al.
10,048,549 B2 * 8/2018 Woo .................. G02F 1/134336
(Continued)

FOREIGN PATENT DOCUMENTS

KR           100603835        7/2006
KR       1020110046125        5/2011
(Continued)

*Primary Examiner* — Nathanael R Briggs
(74) *Attorney, Agent, or Firm* — Cantor Colburn LLP

(57) ABSTRACT

A liquid crystal display includes a first insulation substrate, a gate line, a data line configured to cross the gate line while being insulated therefrom, a thin film transistor connected to the gate line and the data line, a pixel electrode configured to include a first subpixel electrode connected to the thin film transistor and a second subpixel electrode, a second insulation substrate configured to face the first insulation substrate, a common electrode disposed on the second insulation substrate, and a liquid crystal layer disposed between the first insulation substrate and the second insulation substrate to include a plurality of liquid crystal molecules, where each of the first subpixel electrode and the second subpixel electrode includes a unit pixel electrode including a plurality of minute branches that is extended from a horizontal stem and a vertical stem.

17 Claims, 21 Drawing Sheets

Related U.S. Application Data continuation of application No. 14/844,316, filed on Sep. 3, 2015, now Pat. No. 9,778,518.

(52) U.S. Cl.
CPC ............ *G02F 2001/133761* (2013.01); *G02F 2001/134345* (2013.01); *G02F 2001/134354* (2013.01)

(56) References Cited

U.S. PATENT DOCUMENTS

| | | |
|---|---|---|
| 2012/0075562 A1 | 3/2012 | Yeh et al. |
| 2013/0057813 A1 | 3/2013 | Jeong et al. |
| 2014/0022501 A1 | 1/2014 | Wang |
| 2014/0063390 A1* | 3/2014 | Yonekura .......... G02F 1/136286 349/39 |
| 2014/0313449 A1 | 10/2014 | Nakanishi et al. |
| 2015/0036073 A1 | 2/2015 | Im et al. |
| 2015/0055042 A1 | 2/2015 | Chung et al. |

FOREIGN PATENT DOCUMENTS

| | | |
|---|---|---|
| KR | 1020120082472 | 7/2012 |
| KR | 1020150016014 | 2/2015 |
| KR | 1020150016016 | 2/2015 |

* cited by examiner

FIG. 12
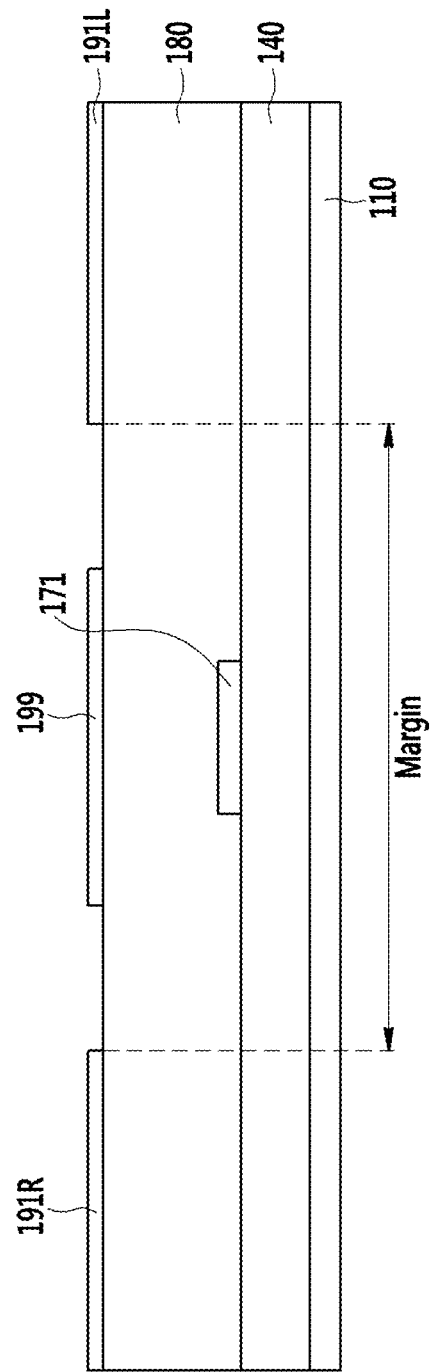

LIQUID CRYSTAL DISPLAY DEVICE

This application is a continuation of U.S. patent application Ser. No. 15/712,885, filed on Sep. 22, 2017, which is a continuation of U.S. patent application Ser. No. 14/844,316, filed on Sep. 3, 2015, which claims priority to Korean Patent Application No. 10-2015-0025398 filed on Feb. 23, 2015, and all the benefits accruing therefrom under 35 U.S.C. § 119, the content of which in its entirety is herein incorporated by reference.

BACKGROUND (a) Field

Exemplary embodiments of the invention relate to a liquid crystal display.

(b) Description of the Related Art

A liquid crystal display ("LCD"), which is one of the most common types of flat panel displays currently in use, includes two sheets of display panels with field generating electrodes, such as a pixel electrode, a common electrode, and the like, and a liquid crystal layer interposed therebetween. In the liquid crystal layer, voltages are applied to the field generating electrodes to generate an electric field in the liquid crystal layer. Then, the alignment of liquid crystal molecules of the liquid crystal layer is determined by the electric field to control the polarization of incident light, thereby displaying images.

Among the LCDs, a vertically aligned mode LCD, in which liquid crystal molecules are aligned such that long axes of the liquid crystal molecules are perpendicular to a display panel in a state in which no electrical field is applied, has been developed.

In the vertical alignment ("VA") mode LCD, a wide viewing angle is considered an important issue, and can be realized by cutouts such as minute slits in the field generating electrodes. Since cutouts and protrusions can determine the tilt directions of the liquid crystal molecules, the tilt directions can be distributed in various directions by using the cutouts and the protrusions, thereby widening the reference viewing angle.

SUMMARY

In a case of providing a plurality of branch electrodes by forming minute slits in a pixel electrode, a response speed of liquid crystal molecules is reduced due to the relationship with liquid crystal control power other than the minute slits of the liquid crystal molecules, and thus texture is displayed for a period of time. Accordingly, the portion at which the texture is displayed is covered by a light blocking member or the luminance of the portion at which the texture is displayed is reduced, thereby decreasing transmittance. Further, the transmittance is reduced due to the minute slits and the pattern of a pixel electrode connected to the minute slits.

In addition, since the size of one pixel is reduced as the LCD has a higher resolution, the minute slits and the texture or the pattern of the pixel electrode connected to the minute slits are increased comparatively with the pixel area. Accordingly, the transmittance is significantly reduced in a high resolution LCD.

The invention has been made in an effort to provide an LCD having the advantage of being capable of improving transmittance. Further, the invention has been made in an effort to provide an LCD having the advantage of being capable of preventing a problem caused by transmittance reduction even where the size of a pixel is reduced as the LCD has a higher resolution.

An exemplary embodiment of the invention provides an LCD including a first insulation substrate, a gate line, a data line configured to cross the gate line while being insulated therefrom, a thin film transistor ("TFT") connected to the gate line and the data line, a pixel electrode configured to include a first subpixel electrode connected to the TFT and a second subpixel electrode, a second insulation substrate configured to face the first insulation substrate, a common electrode disposed on the second insulation substrate, and a liquid crystal layer disposed between the first insulation substrate and the second insulation substrate to include a plurality of liquid crystal molecules, where each of the first subpixel electrode and the second subpixel electrode includes one unit pixel electrode including a plurality of minute branches that is extended from one horizontal stem and one vertical stem.

In an exemplary embodiment, the unit pixel electrode may have two domains having different alignment directions of liquid crystal molecules.

In an exemplary embodiment, a region at which the first subpixel electrode is disposed may be a first subpixel area and a region at which the second subpixel electrode is disposed is a second subpixel area, the vertical stem may be disposed to be adjacent to one vertical side of the first subpixel area and the second subpixel area, one end of the horizontal stem may be connected to a center of the vertical stem, and the minute branches may be disposed to obliquely extend from the vertical stem and the horizontal stem toward the horizontal stem.

In an exemplary embodiment, the first subpixel electrode may have a structure in which the vertical stem is disposed at a right side and the horizontal stem is extended from the right side to a left side, and the minute branches may be extended in an upper right direction or in a lower right direction. The second subpixel electrode may have a structure in which the vertical stem is disposed at the left side and the horizontal stem is extended from the left side to the right side, and the minute branch may be extended in an upper left direction or in a lower left direction.

In an exemplary embodiment, a width of each of the first subpixel electrode and the second subpixel electrode may be equal to or less than about 140 micrometers ($\mu m$).

In an exemplary embodiment, a width of each of the vertical stem or the horizontal stem may be equal to or less than about 25 $\mu m$.

In an exemplary embodiment, the LCD may further include a third subpixel electrode configured to be adjacent to a left side or a right side of the first subpixel electrode, and a fourth subpixel electrode configured to be adjacent to a left side or a right side of the second subpixel electrode, where the third subpixel electrode and the first subpixel electrode have a facing structure, and the fourth subpixel electrode and the second subpixel electrode have a facing structure.

In an exemplary embodiment, the LCD may further include a shielding electrode disposed between adjacent subpixel electrodes, above the data line, and the shielding electrode may be disposed at a same layer as the subpixel electrode.

In an exemplary embodiment, the LCD may further include a shielding electrode disposed between adjacent subpixel electrodes, above the data line, and the shielding electrode may be disposed at a layer that is lower than that of the subpixel electrode so as to partially overlap the subpixel electrode.

In an exemplary embodiment, alignment direction of the liquid crystal molecules which are aligned by the first subpixel electrode and the third subpixel electrode adjacent thereto may be the same, and alignment direction of the liquid crystal molecules which are aligned by the by the second subpixel electrode and the fourth subpixel electrode adjacent thereto may be the same.

In an exemplary embodiment, the LCD may further include a third subpixel electrode configured to be adjacent to a left side or a right side of the first subpixel electrode, and a fourth subpixel electrode configured to be adjacent to a left side or a right side of the second subpixel electrode, and the third subpixel electrode and the first subpixel electrode have a same directional structure, and the fourth subpixel electrode and the second subpixel electrode have a same directional structure.

In an exemplary embodiment, the LCD may further include a voltage-dividing reference line extending in a direction of the data line, so as to include a horizontal portion and a vertical portion.

In an exemplary embodiment, the vertical portion of the voltage-dividing reference line may be disposed to overlap the first subpixel electrode and the vertical stem of the second subpixel electrode.

In an exemplary embodiment, the horizontal portion of the voltage-dividing reference line may be overlapped with horizontal sides of the first subpixel area and the second subpixel area, and thus may be overlapped with one horizontal end of the minute branches of the first subpixel electrode and the second subpixel electrode.

In an exemplary embodiment, a TFT disposed between a TFT forming region provided between the first subpixel area and the second subpixel area may include a first TFT connected to the gate line, the data line, and the first subpixel electrode, a second TFT connected to the gate line, the data line, and the second subpixel electrode, and a third TFT connected to the gate line, the voltage-dividing reference line, and the second subpixel electrode.

In an exemplary embodiment, a TFT disposed between a TFT forming region provided between the first subpixel area and the second subpixel area may include a first TFT connected to the gate line, the data line, and the first subpixel electrode, and a second TFT connected to the gate line, the data line, and the second subpixel electrode.

In an exemplary embodiment, the LCD may further include a color filter disposed on the first insulation substrate or the second insulation substrate, and a light blocking member disposed on the first insulation substrate or the second insulation substrate.

In an exemplary embodiment, the light blocking member may be provided in an extending direction of the gate line.

In an exemplary embodiment, the LCD may be a curved LCD.

In accordance with the LCD according to the exemplary embodiment of the invention, it is possible to eliminate display quality deterioration caused by transmittance reduction that is generated by a portion at which texture is generated, and a pattern of the pixel electrode in the LCD includes a pattern of the minute electrode. Further, even when the LCD has a high resolution, no display quality deterioration is generated by the transmittance reduction. In addition, the exemplary embodiment of the invention may be applied to a flat LCD as well as the curved LCD.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIGS. 12 and 13 are cross-sectional views illustrating a region of a pixel according to exemplary embodiments of the invention;

DETAILED DESCRIPTION

Figure 1:
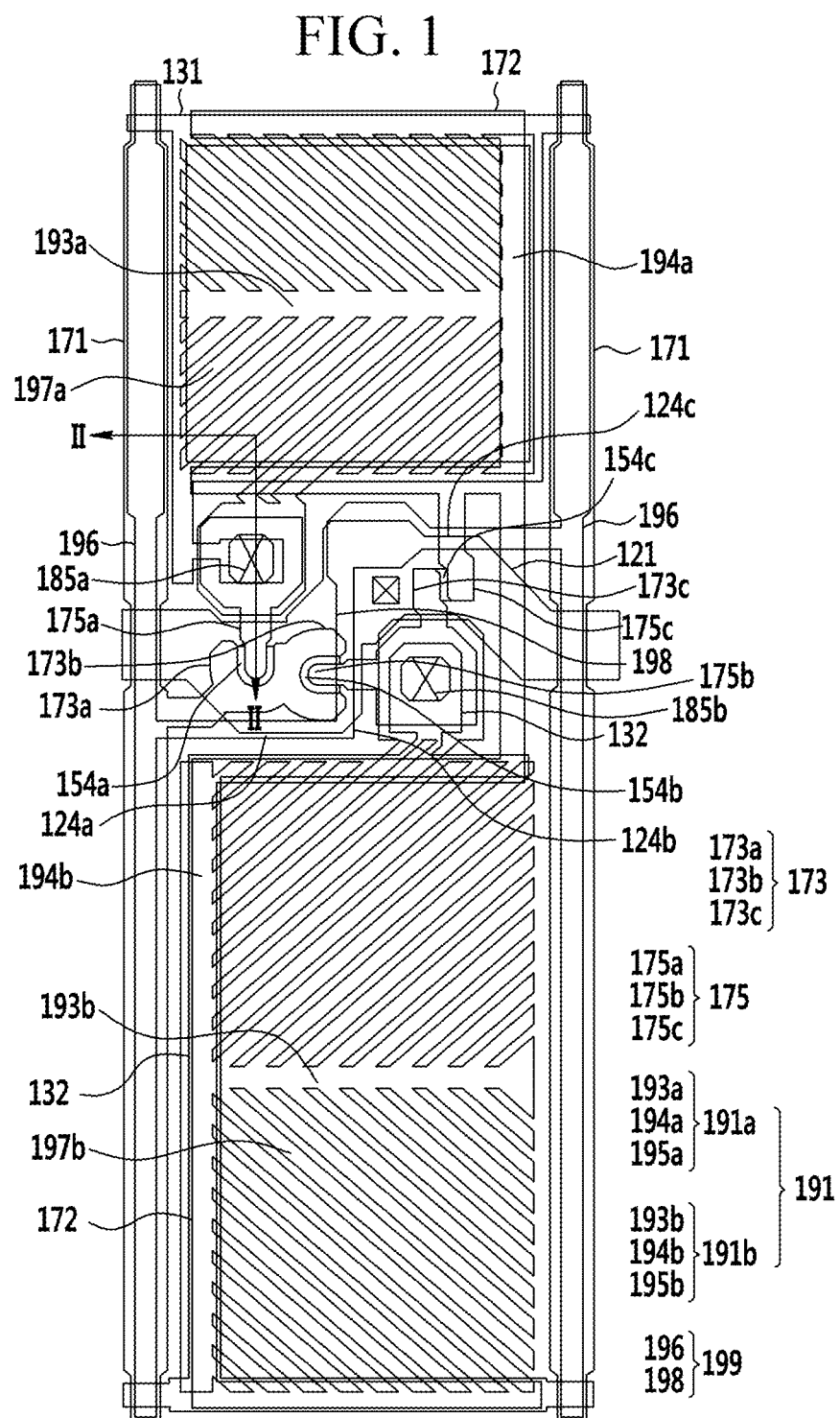
FIG. 1 is a schematic diagram of a pixel according to an exemplary embodiment of the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The structure of a pixel of a liquid crystal display ("LCD") according to an exemplary embodiment of the invention will now be described in detail with reference to FIGS. 1 and 2.

Figure 2:
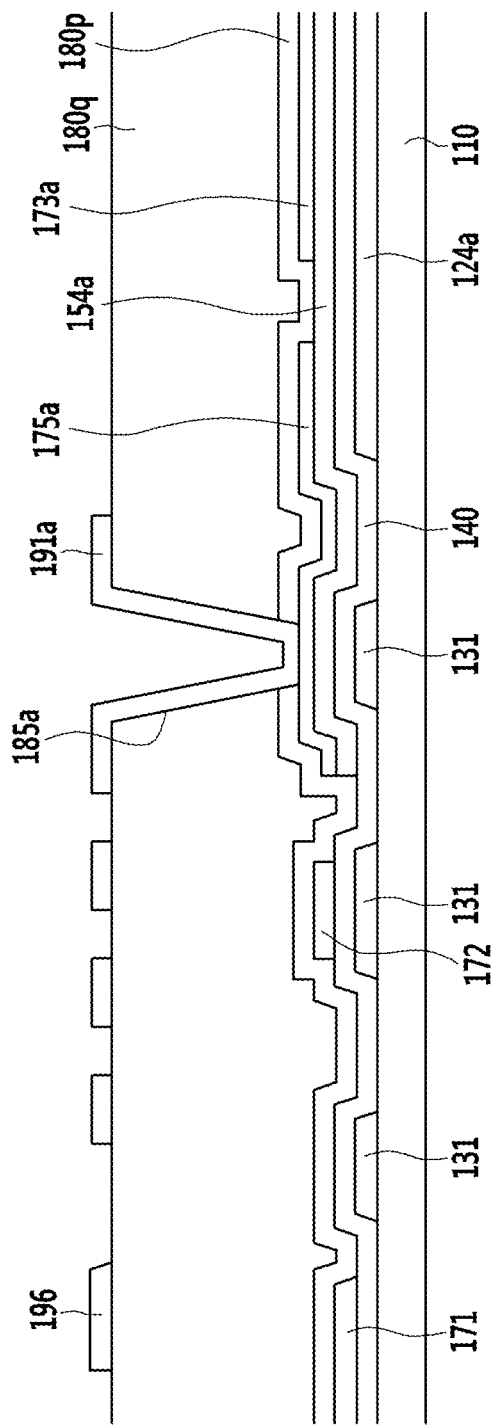
FIG. 2 is a cross-sectional view taken along a line II-II of the pixel according to the exemplary embodiment of FIG. 1.

FIG. 1 is a schematic diagram of a pixel according to an exemplary embodiment of the invention, and FIG. 2 is a cross-sectional view taken along a line II-II of the pixel according to the exemplary embodiment of FIG. 1.

Referring to FIGS. 1 and 2, a gate conductor including a gate line 121 and storage electrode lines 131 and 132 is disposed on a first insulation substrate 110 that includes transparent glass or plastic. The gate line 121 includes gate electrodes 124a, 124b, and 124c, and a wide gate pad (not illustrated) for contact with another layer or an external driving circuit.

In an exemplary embodiment, the gate line 121 and the storage electrode lines 131 and 132 may include an aluminum-based metal, such as, aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). In an exemplary embodiment, the gate line 121 may have a multilayered structure including at least two conductive layers having different physical properties.

The gate line 121 is disposed to traverse a pixel area in an extending direction of a row. A pair of subpixel electrodes for displaying different grays is disposed at opposite ends of the gate line 121. In the exemplary embodiment of FIG. 1, the first subpixel electrode 191a for displaying a high gray is disposed above the gate line 121, and the second subpixel electrode 191b for displaying a low gray is disposed below the gate line 121.

In an exemplary embodiment, the storage electrode lines 131 and 132 include the same material as the gate line 121, and may be provided by using the same process as that of the gate line 121.

In an exemplary embodiment, the first storage electrode line 131 disposed above the gate line 121 may have a quadrangular shape so as to surround the first subpixel electrode 191a, for example. An uppermost side of the quadrangular shaped first storage electrode line 131 may horizontally extend out of one pixel area so as to be connected to another layer or an external driving circuit. Further, the quadrangular shaped first storage electrode line 131 has an extending structure including a left vertical side thereof that is downwardly extended to a first contact hole 185a. This extending structure may not be included according to another exemplary embodiment.

The second storage electrode line 132 disposed below the gate line 121 includes a pair of horizontal portions and one vertical portion that connects the pair of horizontal portions at edges thereof. Further, the second storage electrode line 132 has an extending structure extending upwardly from the horizontal portion to a second contact hole 185b. In another exemplary embodiment, this extending structure may not be included.

Shapes of the storage electrode lines 131 and 132 are described and illustrated in the above exemplary embodiment, but are not limited thereto, and the storage electrode lines 131 and 132 may have any shape for performing the same function without being limited thereto.

A gate insulating layer 140 is disposed on the gate conductor to cover the gate conductor. A conduct hole is defined in a portion of the gate conductor which corresponds to the gate pad (not illustrated) to expose the gate pad. The portions of the gate conductor other than the conduct hole may be covered by the gate insulating layer 140. In an exemplary embodiment, the gate insulating layer 140 may include a material including silicon oxide or silicon nitride, for example.

A semiconductor layer including a first semiconductor layer 154a, a second semiconductor layer 154b, and a third semiconductor layer 154c is disposed on the gate insulating layer 140. The semiconductor layers other than the first semiconductor layer 154a, the second semiconductor layer 154b, and the third semiconductor layer 154c are disposed below the region at which a data conductor including a data line 171, a divided reference voltage line 172, a source electrode 173, and a drain electrode 175 is disposed. This structure is provided in the case that a semiconductor layer is etched together with a data conductor when the data conductor is etched, and the first semiconductor layer 154a, the second semiconductor layer 154b, and the third semiconductor layer 154c defining a channel of a thin film transistor ("TFT") are disposed to correspond to a photoresist corresponding to a transflective region or a slit region on a mask.

In an exemplary embodiment, the semiconductor layer may include an amorphous silicon semiconductor, an oxide semiconductor, or a polycrystalline semiconductor, for example.

A plurality of ohmic contacts (not illustrated) may be disposed on the semiconductors other than the first semiconductor layer 154a, the second semiconductor layer 154b, and the third semiconductor layer 154c, and may be omitted when the semiconductor layer includes an oxide semiconductor.

The data conductor including the data line 171, the divided reference voltage line 172, the source electrode 173, and the drain electrode 175 is disposed on the ohmic contacts. This data conductor will be described in more detail as follows.

The data conductor includes a data line 171, a first source electrode 173a, a second source electrode 173b, a third source electrode 173c, a first drain electrode 175a, a second drain electrode 175b, a third drain electrode 175c, and a divided reference voltage line 172.

In an exemplary embodiment, the data conductor may include an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). In an exemplary embodiment, the data conductor may have a multilayered structure including at least two conductive layers having different physical properties.

The data line 171 is extended in an extending direction of rows on one pixel area, and includes a first source electrode 173a and a second source electrode 173b. The first source electrode 173a and the second source electrode 173b may have a U-shape, but the invention is not limited thereto.

The data line 171 includes a wide data pad (not illustrated) for connection with another layer or an external driving circuit.

The first drain electrode 175a is disposed to face the first source electrode 173a and has, for example, an I-shape corresponding to the U-shaped first source electrode 173a, and includes a widely expanded region that is connected to the first subpixel electrode 191a.

Similarly, the second drain electrode 175b is disposed to face the second source electrode 173b and has, e.g., an I-shape corresponding to the U-shaped second source electrode 173b, and includes a widely expanded region that is connected to the second subpixel electrode 191b.

The third source electrode 173c is provided to extend from one surface of the second drain electrode 175b. As illustrated in FIG. 1, the second drain electrode 175b is extended to form an expanded region, and is extended again from the expanded region to constitute the third source electrode 173c.

The divided reference voltage line 172 is extended in an extending direction of rows, but is bent and extended differently from the data line 171, and includes a third source electrode 173c and a third drain electrode 175c constituting a TFT.

The divided reference voltage line 172 includes a plurality of horizontal portions and a plurality of vertical portions which connect the horizontal portions. Specifically, the divided reference voltage line 172 includes horizontal portions and vertical portions such that the vertical portions connect the horizontal portions with each other at one end of the horizontal portions which are parallel. A structure of the divided reference voltage line 172 will be described in more detail. The divided reference voltage line 172 is roughly divided into three areas. Specifically, the divided reference voltage line 172 is roughly divided into a high gray subpixel area in which the first subpixel electrode 191a for displaying a high gray is disposed, a low gray subpixel area in which the second subpixel electrode 191b for displaying a low gray is disposed, and a TFT forming area disposed between the two subpixel areas in which three TFTs are disposed.

The divided reference voltage line 172 disposed in the high gray subpixel area has an inverse angulated ⊏-shaped structure, includes a pair of horizontal portions and one vertical portion which connects the horizontal portions, and is disposed along an outer circumference of the high gray subpixel area. The divided reference voltage line 172 disposed in the low gray subpixel area has an angulated ⊏-shaped structure, includes a pair of horizontal portions and one vertical portion for the connecting the horizontal portions, and is disposed at an outer circumference of the low gray subpixel area. Finally, the divided reference voltage line 172 disposed in the TFT forming area includes the angulated ⊏-shaped structure, a vertical portion for connecting the inverse angulated ⊏-shaped structure, and the third drain electrode 175c. In this case, the vertical portion is disposed at a right side of the TFT forming area, and the third drain electrode 175c is extended from a horizontal portion disposed below the inverse angulated ⊔-shaped structure. The detailed structure of the divided reference voltage line 172 may be variously changed according to exemplary embodiments.

The data conductor, the ohmic contacts, and the semiconductor layer may be simultaneously provided by using one mask.

The first gate electrode 124a, the first source electrode 173a, and the first drain electrode 175a constitute a first TFT Qa (refer to FIG. 14) together with the first semiconductor layer 154a, and a channel of the first TFT is defined at the first semiconductor layer 154a disposed between the first source electrode 173a and the first drain electrode 175a. Similarly, the second gate electrode 124b, the second source electrode 173b, and the second drain electrode 175b constitute a second TFT Qb (refer to FIG. 14) together with the second semiconductor layer 154b, and a channel of the second thin film layer is defined at the second semiconductor layer 154b disposed between the second source electrode 173b and the second drain electrode 175b. The third gate electrode 124c, the third source electrode 173c, and the third drain electrode 175c constitute a third TFT Qc (refer to FIG. 14) together with the third semiconductor layer 154c, and a channel of the third thin film layer is defined at the third semiconductor layer 154c disposed between the third source electrode 173c and the third drain electrode 175c.

A first passivation layer 180p is disposed on the data conductor and the exposed semiconductor layers 154a, 154b, and 154c. In an exemplary embodiment, the first passivation layer 180p may include a silicon nitride, a silicon oxide, or the like that is used to form an inorganic insulating layer, for example. In an exemplary embodiment, a second passivation layer 180q is disposed on the first passivation layer 180p, and may include an organic material unlike the first passivation layer 180p, for example. According to another exemplary embodiment, one of the first passivation layer 180p and the second passivation layer 180q may be omitted. According to another exemplary embodiment, a color filter may be disposed at the position of the second passivation layer 180q. In this case, the first passivation layer 180p may serve to prevent a pigment of the color filter from flowing into the exposed semiconductor layers 154a, 154b, and 154c. Even when the color filter is disposed, the second passivation layer 180q may be provided to cover the color filter.

In the case where the second passivation layer 180q is the color filter, and where the color filter is disposed at an additional position, the second passivation layer 180q may intrinsically display any one primary color, and examples of the primary colors may include three primary colors such as red, green, and blue, or yellow, cyan, and magenta, or the like. Although not illustrated, a color filter may further include a color filter for displaying a mixed color of the primary colors or white in addition to the primary colors.

A first contact hole 185a and a second contact hole 185b are defined in the first and second passivation layers 180p and 180q to expose the first and second drain electrodes 175a and 175b, respectively.

A pixel electrode 191 and a shielding electrode 199 are disposed on the second passivation layer 180q.

The pixel electrode 191 includes the first subpixel electrode 191a and the second subpixel electrode 191b, which interpose the gate line 121 therebetween to be separated from and to neighbor each other in the column direction. The first subpixel electrode 191a is disposed in the high gray subpixel area, and the second subpixel electrode 191b is disposed in the low gray subpixel area.

Each of the first subpixel electrode 191a and the second subpixel electrode 191b includes one horizontal stem 193a and 193b and one vertical stem 194a and 194b, and further includes a plurality of minute branches 197a and 197b which is obliquely extended therefrom.

In this case, the minute branches 197a are arranged in two directions, and thus the first subpixel electrode 191a or the second subpixel electrode 191b has two domains. The structure of the first subpixel electrode 191a or the second subpixel electrode 191b including two domains is referred to as one unit pixel electrode.

As shown in FIG. 1, the low gray subpixel area is about 1.5 times to about 2.5 times larger than the high gray subpixel area. As such, although the two subpixel areas are different from each other, one horizontal stem and one vertical stem are provided in each of the two subpixel areas according to the exemplary embodiment of the invention. In other words, according to an exemplary embodiment of the invention, the first and second subpixel electrodes 191a and 191b respectively include the minute branches 197a and 197b, each of which is arranged in two directions, and thus each includes two domains. These two domains are fewer than the four domains of one general subpixel electrode. The improved transmittance due to using the reduced number of domains will be described later with reference to FIGS. 6 to 9.

Extending directions of the minute branches 197a in the high gray subpixel electrode are different from those of the minute branches 197b in the low gray subpixel electrode. Specifically, in the high gray subpixel electrode 191a, the vertical stem 194a is disposed at a right side, the horizontal stems 193a are extended from the right side to a left side, and the minute branches 197a are extended in an upper right direction or in a lower right direction. In contrast, in the low gray subpixel electrode 191b, the vertical stem 194b is disposed at the left side, the horizontal stem 193b is extended from the left side to the right side, and the minute branches 197b are extended in an upper left direction or in a lower left direction.

The vertical stems 194a and 194b of the first subpixel electrode 191a and the second subpixel electrode 191b, respectively, are overlapped with the vertical portions of the divided reference voltage line 172, and the horizontal stems 193a and 193b thereof are not overlapped with the horizontal portions of the divided reference voltage line 172.

Although the pixel size gets smaller in a higher resolution LCD, a predetermined number of minute branches or stems may be provided to have a predetermined size. In the exemplary embodiment of the invention, one stem is provided in one subpixel area, and thus the texture generated in the pixel area can be controlled, display errors can be reduced, and light transmittance can be improved.

Further, in the case of providing a curved display device, it is possible to reduce display errors caused by misalignment between upper and lower substrates through the pixel electrode that is extended from the horizontal stem. As a result, the LCD according to the exemplary embodiment of the invention can be applied to a curved LCD having a curved structure as well as a general LCD having a flat structure. Particularly, the LCD according to the exemplary embodiment of the invention has relatively further improved characteristics in the curved structure compared to other pixel structures.

The shielding electrode 199 includes vertical portions 196 that are extended along the data line 171, and one or more horizontal portions 198 that interconnect the adjacent vertical portions 196. The horizontal portion 198 of the shielding electrode 199 may include an expanded region at the center thereof. The shielding electrode 199 may receive the same voltage as a common electrode 270 (refer to FIG. 8). Accordingly, no electric field is generated between the shielding electrode 199 and the common electrode 270, and thus liquid crystal molecules interposed therebetween are not aligned. As a result, the liquid crystal molecules interposed between the shielding electrode 199 and the common electrode 270 are in a black state. As such, in the case that a polarizer (not illustrated) is attached such that a state in which no electric field is applied to the liquid crystal molecules is displayed as black, the corresponding region can be covered by the liquid crystal molecules themselves to be invisible without using an additional light blocking member. Accordingly, in the display device according to the exemplary embodiment of the invention, a light blocking member disposed on a second insulation substrate to extend in an extending direction of columns (an extending direction of the data line) can be omitted at some portions at least, thereby improving transmittance. In this case, the light blocking member may be provided in the extending direction of the gate line, and may be disposed on a first or second insulation substrate.

In an exemplary embodiment, the pixel electrode 191 and the shielding electrode 199 may include a transparent material such as indium tin oxide ("ITO") and indium zinc oxide ("IZO").

An upper display panel will now be described. Although not illustrated, the upper display panel is a constituent element that is required to accommodate a liquid crystal layer in the LCD. However, in an LCD including an additional structure for accommodating the liquid crystal layer, the upper display panel may be omitted.

The upper display panel included in an LCD will be described.

A light blocking member (not illustrated) is disposed on a second insulation substrate (not illustrated) disposed to face a first insulation substrate 110 including transparent glass, plastic, or the like. The light blocking member is also referred to as a black matrix and prevents light leakage. The light blocking member which is described to be disposed in the upper display panel may be disposed in a lower display panel according to another exemplary embodiment.

In the exemplary embodiment, the light blocking member may be disposed to extend in a column direction extending along the data line 171. This is because no light blocking member is additionally required since the liquid crystal layer itself displays black at the region provided along the data line 171 by the action of the shielding electrode 199. However, to accomplish a stronger light blocking characteristic, a light blocking member may be disposed along the data line 171. In this case, although the light blocking member is disposed along the data line 171, this light blocking member may have a width that is narrower than that of a general light blocking member. Accordingly, the transmittance can be improved.

A plurality of color filters (not illustrated) is also disposed on the second insulation substrate.

An overcoat (not illustrated) may be disposed on the color filters and the light blocking member. The overcoat may include an organic insulator in order to remove steps caused by the color filters and the light blocking member and to provide a flat surface. In another exemplary embodiment, the overcoat may be omitted.

A common electrode 270 (refer to FIG. 8) is disposed on the overcoat. In an exemplary embodiment, the common electrode 270 may include the same material as that of the pixel electrode 191, and may be provided in a flat surface type to receive a common voltage, for example.

Further, an alignment layer (not illustrated) may be disposed inside the pixel electrode 191 and the common electrode 270.

A liquid crystal layer (not illustrated) may be disposed inside the alignment layer between the lower display panel and the upper display panel. The liquid crystal layer has negative dielectric anisotropy, and liquid crystal molecules of the liquid crystal layer are aligned such that long axes thereof are perpendicular to surfaces of the upper and lower display panels in a state in which no electric field is generated.

The first and second subpixel electrodes 191a and 191b, to which the data voltage is applied, generate an electric field along with the common electrode 270 (refer to FIG. 8) of the upper display panel 200 (refer to FIG. 8), thereby determining the alignment directions of the liquid crystal molecules of the liquid crystal layer interposed between the two electrodes 191 and 270. Depending on the determined directions of the liquid crystal molecules, a phase difference of light passing through the liquid crystal layer is varied, and thus an amount of light passing through the polarizer is adjusted to control display luminance.

In the above exemplary embodiments, the pixel structure of the LCD in which one horizontal stem 193b and one vertical stem 194b are provided even in the low gray subpixel area was described.

Hereinafter, a detailed structure thereof will be described with reference to FIGS. 3 to 5.

Figure 3:
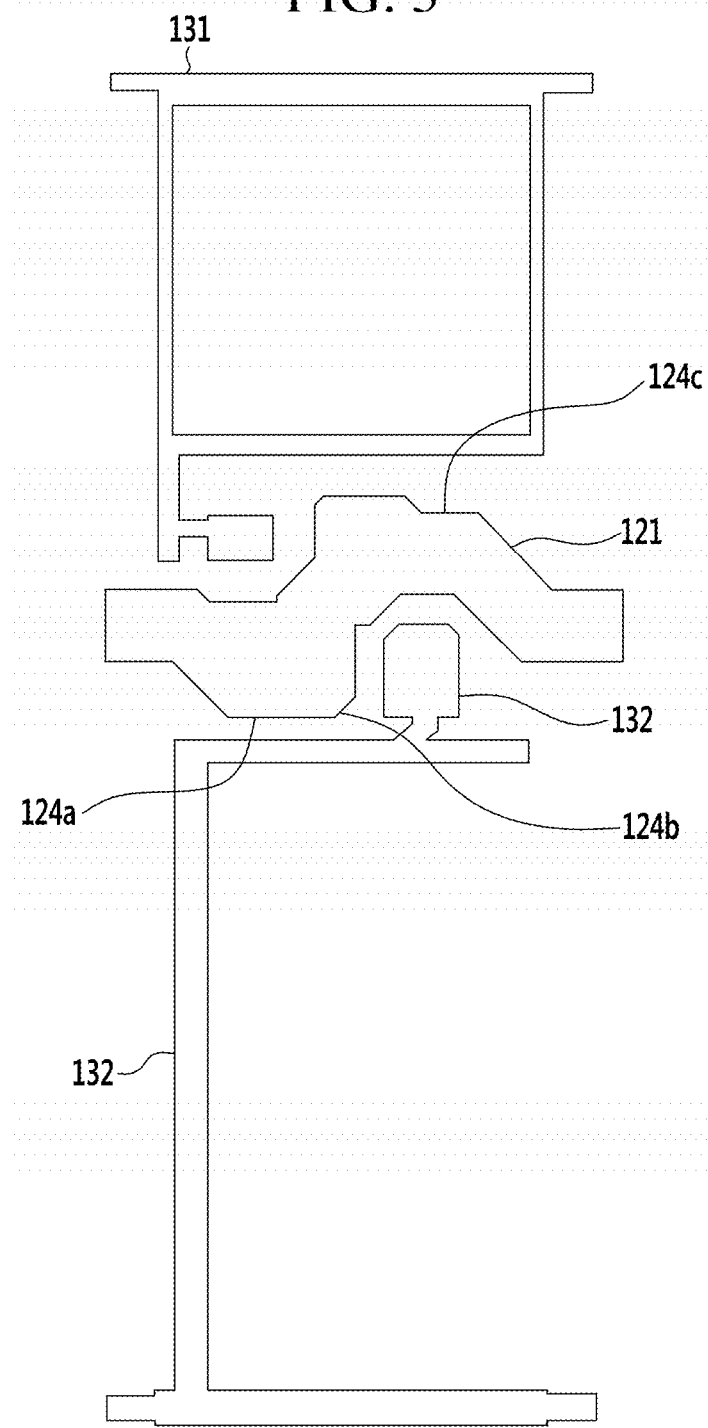
FIGS. 3 to 5 are stepwise processing views illustrating the pixel according to the exemplary embodiment of FIG. 1.
Figure 4:
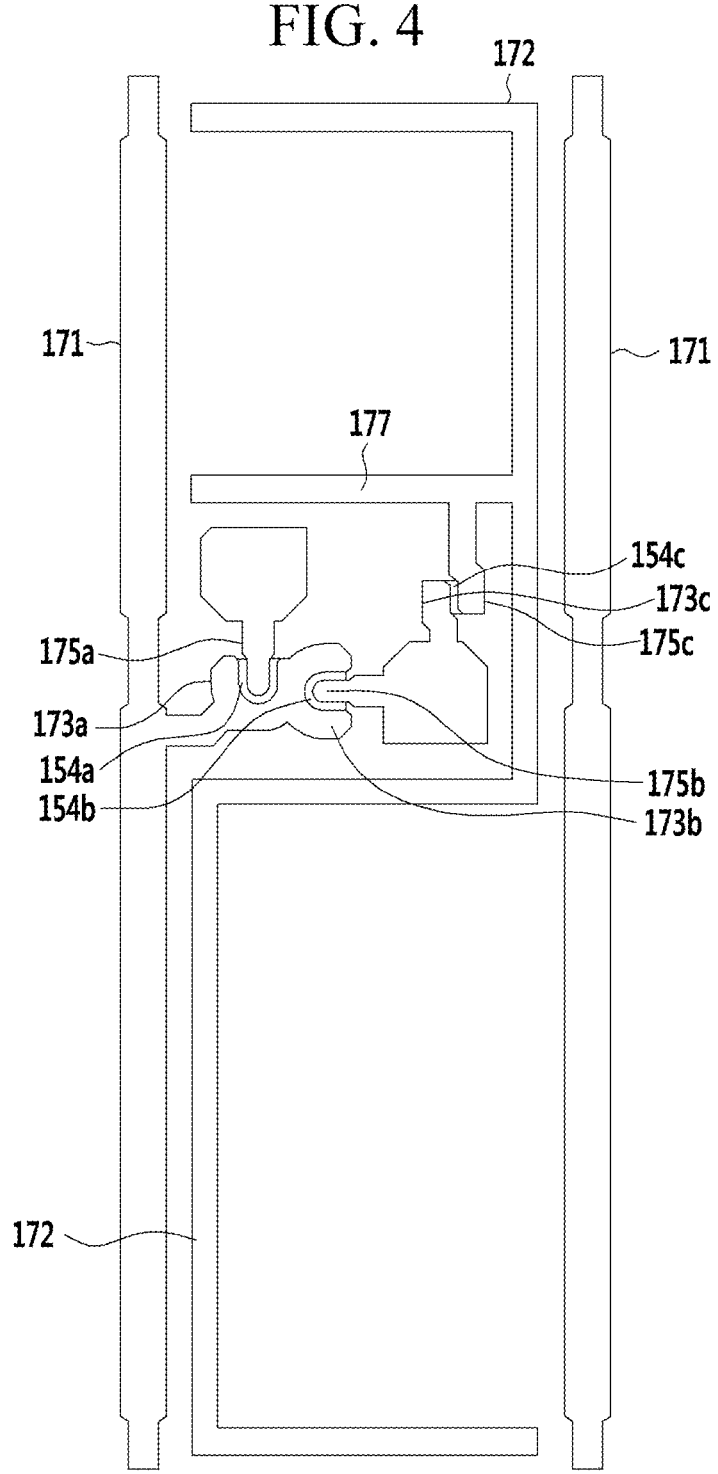
Figure 5:
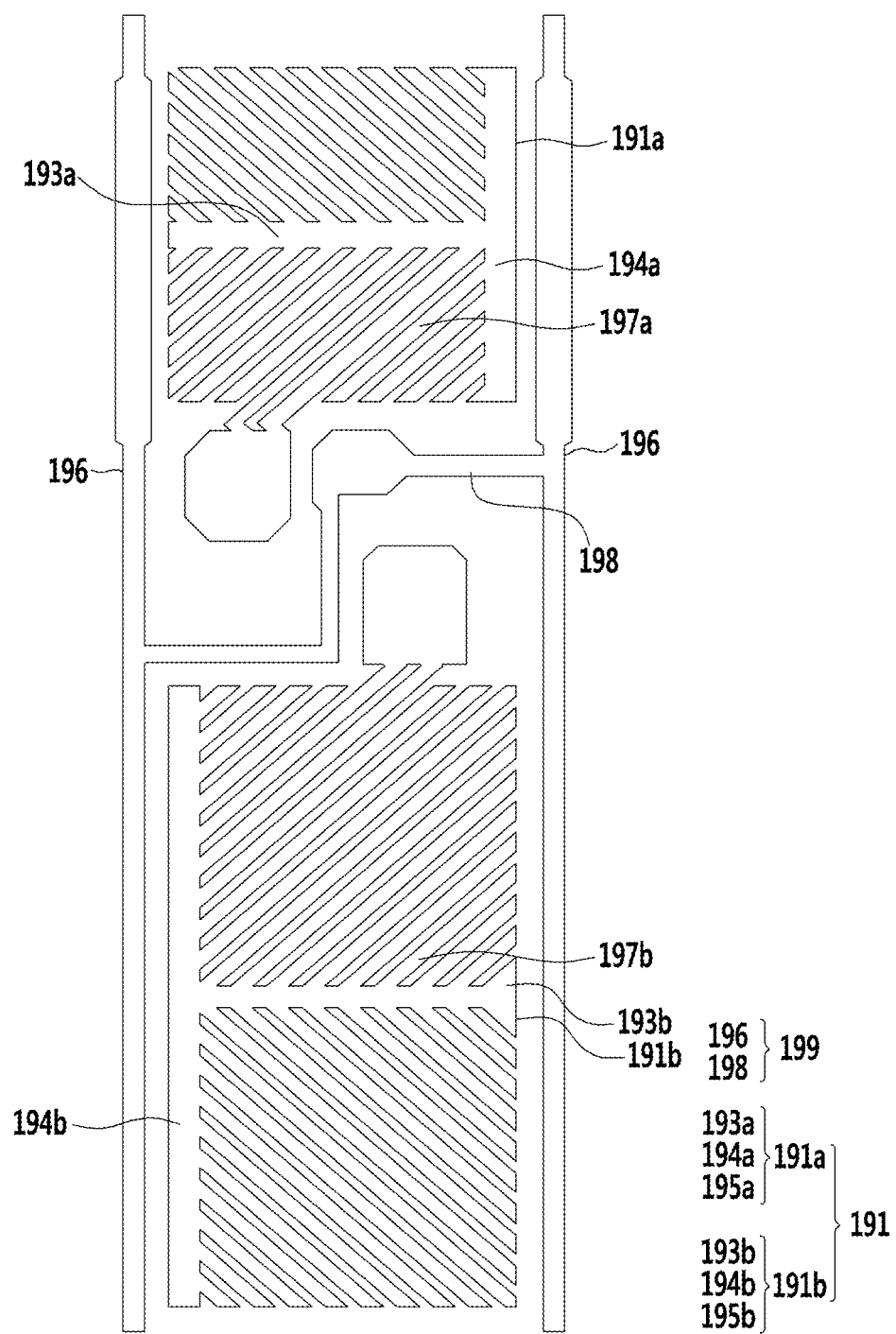

FIGS. 3 to 5 are stepwise processing views illustrating the pixel according to the exemplary embodiment of FIG. 1.

First, a structure of the gate conductor is illustrated in FIG. 3.

Referring to FIG. 3, the gate conductor includes the gate line 121 and the storage electrode lines 131 and 132. A gate conductor material is stacked on an insulation substrate, and then a photoresist pattern is disposed thereon in order to be etched to form the gate conductor.

The gate line 121 is disposed to traverse a pixel area in an extending direction of rows. The first storage electrode line 131 has a quadrangular structure above the gate line 121, and the second storage electrode line 132 has an angulated ⊏-shaped structure.

The gate line 121 has a partially bent structure that upwardly and downwardly protrudes at portions at which the first to third gate electrodes 124a, 124b, and 124c are disposed.

An uppermost side of the quadrangular shaped first storage electrode line 131 may be out of one pixel area so as to horizontally extend to be connected to another layer or an external driving circuit. Further, the quadrangular shaped first storage electrode line 131 has an extending structure, including a left vertical side thereof that is downwardly extended to a first contact hole 185a (refer to FIG. 1). This extending structure may not be included according to another exemplary embodiment.

The angulated ⊏-shaped structure of the second storage electrode line 132 includes a pair of horizontal portions and one vertical portion that connects the pair of horizontal portions at edges thereof. Further, the second storage electrode line 132 has an extending structure extending upwardly from the horizontal portion to a second contact hole 185b (refer to FIG. 1). This extending structure may not be included according to another exemplary embodiment.

After the gate conductor illustrated in FIG. 3 is provided, a gate insulating layer material, a semiconductor material, and a data conductor material are sequentially stacked. Next, the semiconductor material and the data conductor material are etched by using one mask, to form a structure illustrated in FIG. 4. According to another exemplary embodiment, an ohmic contact layer may be further disposed between the semiconductor material and the data conductor material to have the same shape as that of the data conductor.

Referring to FIG. 4, the data conductor includes a data line 171, a first source electrode 173a, a second source electrode 173b, a third source electrode 173c, a first drain electrode 175a, a second drain electrode 175b, a third drain electrode 175c, and a divided reference voltage line 172.

The data line 171 is extended in an extending direction of rows on one pixel area, and includes a first source electrode 173a and a second source electrode 173b. Each of the first source electrode 173a and the second source electrode 173b are disposed to have a U-shape. Specifically, the first source electrode 173a has a U-shape with an upper side open, and the second source electrode 173b has a U-shape with a right side open.

The first drain electrode 175a is disposed to face the first source electrode 173a and to have an I-shape corresponding to the U-shaped first source electrode 173a, and includes a widely expanded region that is connected to the first subpixel electrode 191a.

The second drain electrode 175b is disposed to face the second source electrode 173b and to have an I-shape corresponding to the U-shaped second source electrode 173b, and includes a widely expanded region that is connected to the second subpixel electrode 191b.

The third source electrode 173c is provided by extending from a surface of the second drain electrode 175b and then extending from a region extended from the second drain electrode 175b.

The divided reference voltage line 172 is extended in an extending direction of rows, but is bent and extended unlike the data line 171 and third drain electrode 175c. The divided reference voltage line 172 includes horizontal portions and vertical portions such that the vertical portions connect the horizontal portions which are parallel with each other at one end of the horizontal portions. As illustrated in FIG. 4, the divided reference voltage line 172 is roughly divided into three areas. The divided reference voltage line 172 disposed in the high gray subpixel area has an inverse angulated ⊏-shaped structure, includes a pair of horizontal portions and one vertical portion which connects the horizontal portions, and is disposed along an outer circumference of the high gray subpixel area. Further, the divided reference voltage line 172 disposed in the low gray subpixel area has an angulated ⊏-shaped structure, includes a pair of horizontal portions and one vertical portion which connects the horizontal portions, and is disposed along an outer circumference of the low gray subpixel area. Finally, the divided reference voltage line 172 disposed in the TFT forming area includes a vertical portion for connecting the inverse angulated ⊏-shaped structure and the angulated ⊏-shaped structure, and the third drain electrode 175c. In this case, the vertical portion is disposed at a right side of the TFT forming area, and the third drain electrode 175c is extended from a horizontal portion disposed below the inverse angulated ⊏-shaped structure.

When the data conductor is etched, the semiconductor layer is also etched, and most parts of the semiconductor layer are disposed below the data conductor. However, the first semiconductor layer 154a, the second semiconductor layer 154b, and the third semiconductor layer 154c at which channels of the thin film layers are respectively defined are exposed thereabove. A slit mask or a transflective mask is employed to form the first semiconductor layer 154a, the second semiconductor layer 154b, and the third semiconductor layer 154c, which are exposed.

In other words, when the data conductor is provided, the slit mask or the transflective mask is employed. In this case, the slit mask or the transflective mask includes a transmissive region, a blocking region, and a transflective region. A transflective layer or slits are provided at the transflective region. Photoresist provided as the transmissive region and the blocking region is used to form most patterns of the data conductor, and the first semiconductor layer 154a, the second semiconductor layer 154b, and the third semiconductor layer 154c, as the remaining regions, are provided by the photoresist provided through the transflective region. The patterns of the data conductor, the first semiconductor layer 154a, the second semiconductor layer 154b, and the third semiconductor layer 154c are provided by using one mask and one process.

Next, the first and second passivation layers 180p and 180q are provided to cover the data conductor and the exposed semiconductors (the first semiconductor layer 154a, the second semiconductor layer 154b, and the third semiconductor layer 154c) and a gate insulating layer, thereon. Next, a first contact hole 185a and a second contact hole 185b are respectively defined to expose the first drain electrode 175a and the second drain electrode 175b.

Next, as illustrated in FIG. 5, the pixel electrode 191 and the shielding electrode 199 are provided.

The pixel electrode 191 includes the first subpixel electrode 191a and the second subpixel electrode 191b. The first subpixel electrode 191a is disposed in the high gray subpixel area, and the second subpixel electrode 191b is disposed in the low gray subpixel area.

The first subpixel electrode 191a and the second subpixel electrode 191b respectively include one horizontal stem 193a and 193b and one vertical stem 194a and 194b, and further include a plurality of minute branches 197a and 197b which is obliquely extended therefrom, respectively.

In this case, the minute branches 197a are arranged in two directions, and thus the first subpixel electrode 191a or the second subpixel electrode 191b has two domains. The structure of the first subpixel electrode 191a or the second subpixel electrode 191b including two domains is referred to as one unit pixel electrode.

The low gray subpixel area is about 1.5 times to about 2.5 times larger than the high gray subpixel area. As such, although the two subpixel areas are different from each other, one horizontal stem and one vertical stem are provided in each of the two subpixel areas according to the exemplary embodiment of the invention. In other words, according to an exemplary embodiment of the invention, the first and second subpixel electrodes 191a and 191b respectively includes the minute branches 197a and 197b, each of which is arranged in two directions, and thus each includes two domains. These two domains are fewer than the four of the domains of one general subpixel electrode. The transmittance improvement caused by using the reduced number of domains will be described later with reference to FIGS. 6 to 9.

The vertical stems 194a and 194b of the first subpixel electrode 191a and the second subpixel electrode 191b are overlapped with the vertical portions of the divided reference voltage line 172, and the horizontal stems 193a and 193b thereof are not overlapped with the horizontal portions of the divided reference voltage line 172.

Although the pixel size gets smaller in a higher resolution LCD, a predetermined number of minute branches or stems may be provided to have a predetermined size. In the exemplary embodiment of the invention, one stem is provided in one subpixel area, and thus the texture generated in the pixel area can be controlled, display errors can be reduced, and light transmittance can be improved.

Further, in the case of providing a curved display device, it is possible to reduce display errors caused by misalignment between upper and lower substrates through the pixel electrode that is extended from the horizontal stem. As a result, the LCD according to the exemplary embodiment of the invention can be applied to a curved LCD having a curved structure as well as a general LCD having a flat structure. Particularly, the LCD according to the exemplary embodiment of the invention has relatively further improved characteristics in the curved structure compared to other pixel structures.

The shielding electrode 199 includes vertical portions 196 that are extended along the data line 171, and one or more horizontal portions 198 that interconnect the adjacent vertical portions 196. The horizontal portion 198 of the shielding electrode 199 may include an expanded region at the center thereof. The shielding electrode 199 may receive the same voltage as a common electrode 270 (refer to FIG. 8). Accordingly, no electric field is generated between the shielding electrode 199 and the common electrode 270, and thus liquid crystal molecules interposed therebetween are not aligned. As a result, the liquid crystal molecules interposed between the shielding electrode 199 and the common electrode 270 are in a black state. As such, in the case that a polarizer (not illustrated) is attached such that a state in which no electric field is applied to the liquid crystal molecules is displayed as black, the corresponding region can be covered by the liquid crystal molecules themselves to be invisible without using an additional light blocking member. Accordingly, in the display device according to the exemplary embodiment of the invention, a light blocking member disposed on a second insulation substrate to extend in the column direction can be omitted at some portions at least, thereby improving transmittance.

In an exemplary embodiment, the pixel electrode 191 and the shielding electrode 199 may include a transparent material such as ITO and IZO.

Characteristics of an LCD having a structure provided as such will be described with reference to FIGS. 6 to 9.

Figure 6:
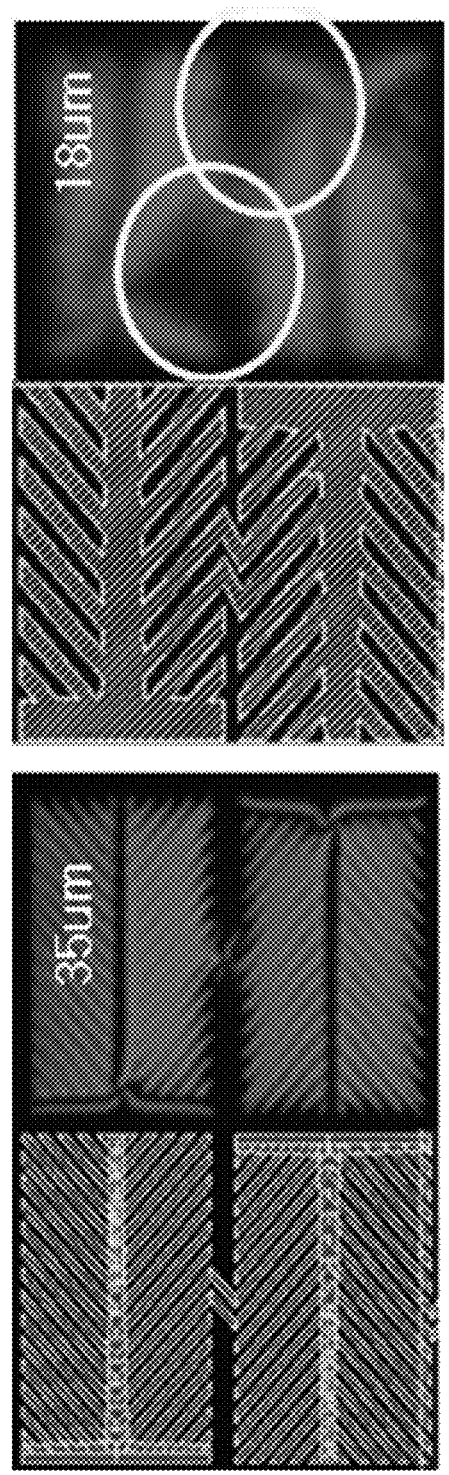
FIG. 6 illustrates a relationship between the size of a pixel and texture generation.

FIG. 6 illustrates a relationship between the size of a pixel and texture generation.

Two pixels, each having different widths and textures, are illustrated in FIG. 6.

The left pixel illustrates a high gray subpixel electrode of a pixel included in an LCD having 46-inch full HD resolution (on the left) along with a photograph of texture (on the right). The left pixel has a width of about 210 micrometers (μm), and one stem has a width of about 35 μm. Further, fourteen slits are provided by the minute branches. It is shown that when the pixel having this structure is used, barely any texture is generated.

The right pixel illustrates a high gray subpixel electrode of a pixel included in an LCD having 55-inch full HD resolution (on the left) along with a photograph of texture (on the right). The right pixel has a width of about 105 μm, and one stem has a width of about 18 μm. Further, seven slits are provided by the minute branches. It is seen that when the pixel having this structure is used, a significant amount of texture is generated, thereby reducing the transmittance.

One reason that the transmittance is deteriorated by such texture is that the space occupied by the pixel electrode is reduced as the resolution is increased. In addition, another reason is that a rate at which widths of the stems and/or the minute branches are reduced is relatively smaller than a rate at which an area of the pixel is reduced. This is because the widths of the stems and/or the minute branches are determined by the resolution of a light exposer, and as the pattern of the pixel electrode is miniaturized, the resolution of the light exposer approaches its limit.

Further, the structure of the pixel electrode used in FIG. 6 includes two unit pixel electrodes each of which includes one horizontal stem, one vertical stem, and a plurality of minute branches, unlike in the exemplary embodiment of the invention. As a result, a connector may be disposed to connect the two unit pixel electrodes, and the alignment direction of the liquid crystal molecules positioned around the connector may be different from the alignment direction of the liquid crystal molecules positioned at each domain. In FIG. 6, it can be seen that no texture is generated in the left pixel having a large size, while the problem in the alignment of the liquid crystal molecules affects the domains in the right pixel.

As such, since one subpixel electrode includes a unit pixel electrode having two domains in a high resolution pixel having a small size, each of the subpixel electrodes includes unit pixel electrodes having two domains in the invention.

According to the experiment in FIG. 6, in the case the pixel electrode has a width of about 105 μm when two unit pixel electrodes are used, texture is generated. However, in the case of 210 μm, no texture is generated. In consideration of another experiment, in the case that the pixel electrode has a width of 140 μm or less, it is possible to help to improve display quality by using one unit pixel electrode to form one subpixel electrode, as in the exemplary embodiment of the invention.

Further, in the case that the horizontal stem or vertical stem has a width of 25 μm or less, it is possible to help to improve display quality by using one unit pixel electrode to form one subpixel electrode.

Figure 7:
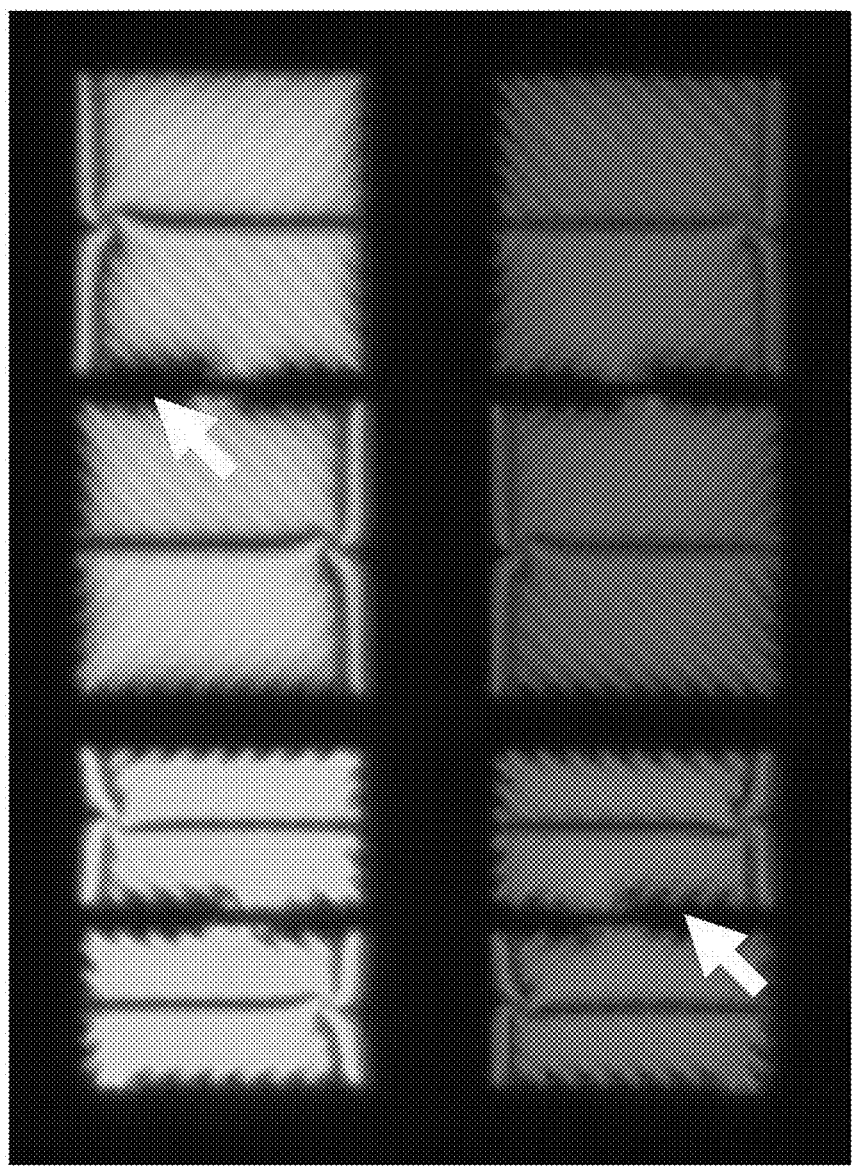
FIG. 7 illustrates texture generated in an LCD.

FIG. 7 also illustrates texture generated in a pixel of a 55-inch LCD, as shown in the right pixel of FIG. 6.

In FIG. 7, a structure in which the high gray subpixel electrode includes two unit pixel electrodes and the low gray subpixel electrode includes two unit pixel electrodes is illustrated.

As indicated by arrows in FIG. 7, it can be seen that texture is generated around a connector which connects the two unit pixel electrodes. Accordingly, in the case of the pixel having a predetermined size level i.e., a width of 210 μm or less, it is possible to reduce the texture by using one unit pixel electrode.

Figure 8:
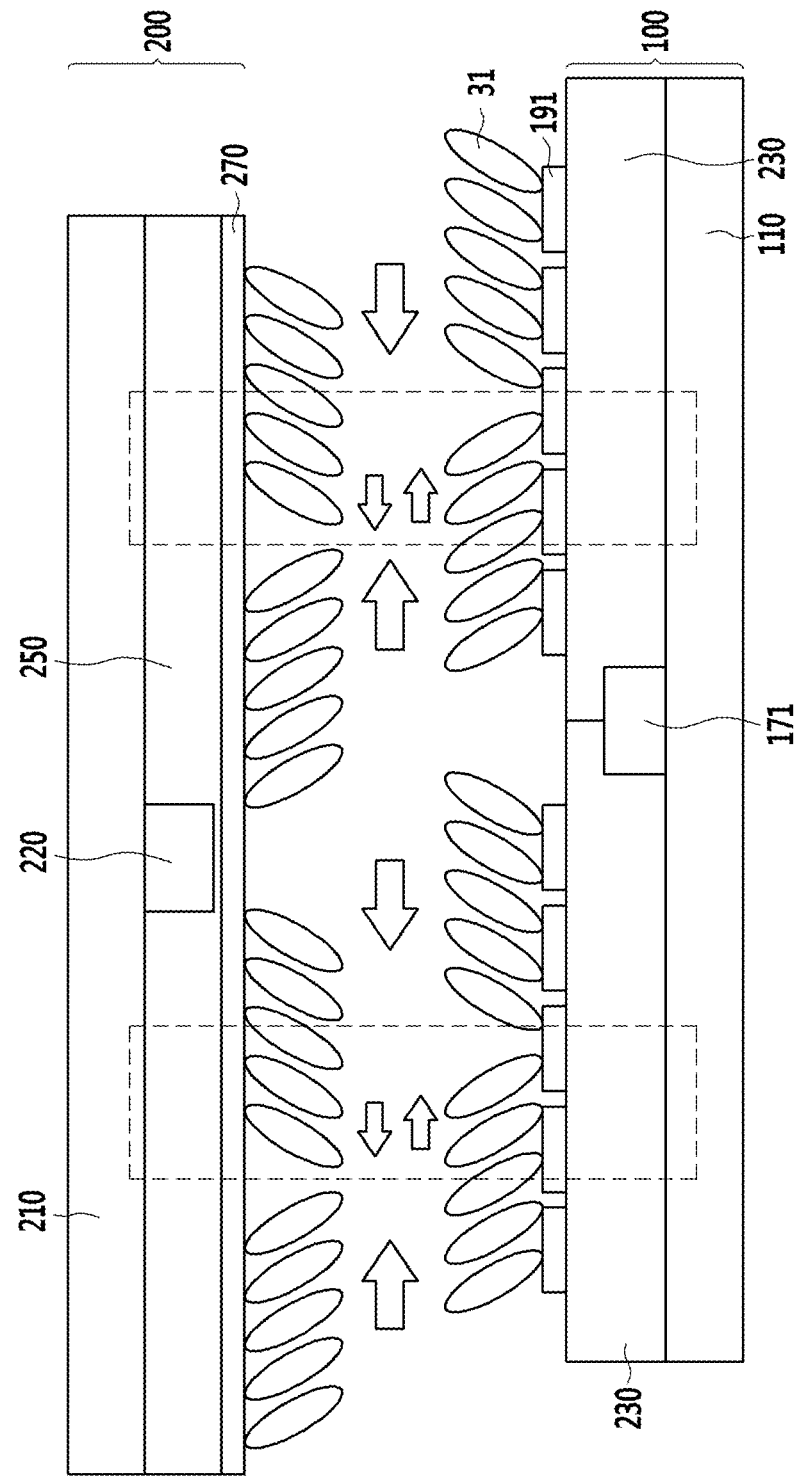
FIG. 8 is a cross-sectional view to explain the reason that texture is generated as shown in FIGS. 6 and 7.

FIG. 8 illustrates the reason that texture is generated in a curved LCD.

FIG. 8 is a cross-sectional view of an LCD according to an embodiment, which will be described in brief.

In the lower display panel, the data line 171 is disposed in the lower substrate 110. Further, different color filters are separately disposed based on the data line 171. Although an insulating layer and a wiring layer may be disposed between the lower insulation substrate 110 and the data line 171, they are omitted for the sake of brevity in this illustration. The pixel electrode 191 may be disposed on the color filters 230. In the upper display panel, a light blocking member 220 is disposed at a side of an upper insulation substrate 210. Further, an overcoat 250 is disposed to cover the light blocking member 220. The common electrode 270 is disposed below the overcoat 250. A liquid crystal layer having liquid crystal molecules 31 is disposed between the upper display panel and the lower display panel.

In the case that the LCD is provided as a curved type, curvatures of an upper substrate and a lower substrate are changed, alignment directions of an upper group and a lower group of liquid crystal modules are partially inverse to each other. These opposite alignments may be viewed as texture when generated at one domain. Accordingly, the curved LCD has a higher possibility of generating texture than the flat LCD. Accordingly, as in the exemplary embodiment of the invention, the texture can be reduced to improve transmittance by using one unit pixel electrode to form each subpixel electrode.

Figure 9:
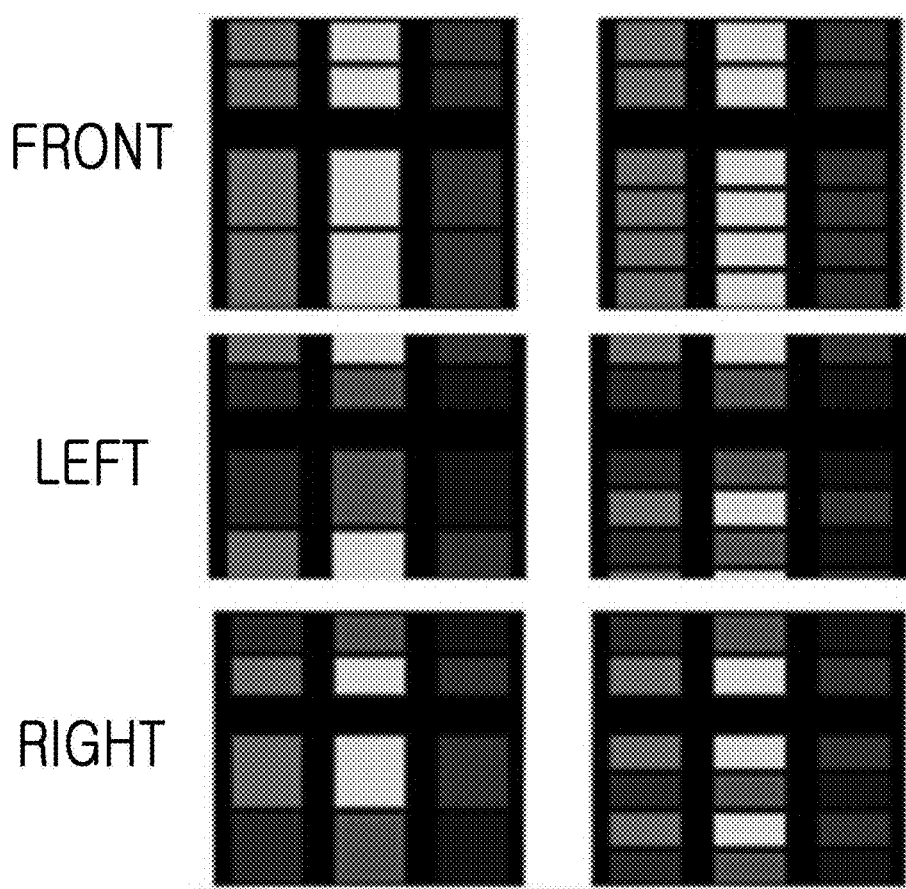
FIG. 9 illustrates transmittance of a pixel according to an experimental example and a comparative example.

FIG. 9 illustrates transmittance comparison between an experimental example in which one subpixel electrode is provided by using one unit pixel electrode and a comparative example in which one of two subpixel electrodes includes two unit pixel electrodes.

FIG. 9 illustrates a portion of one display panel, specifically a first pixel and a second pixel and a third pixel that are upwardly and downwardly adjacent to the first pixel. That is, one pixel extends from a top black line to a bottom black line over a middle bold black line in each picture. The adjacent pixels are illustrated at an upper side and a lower side of the pixel. Specifically, one subpixel (high gray subpixel) of the pixel extends from the top black line to the middle bold black line, and the other subpixel (low gray subpixel extends from the middle bold black line to the bottom black line). Further, in the left column of FIG. 9, one subpixel includes one unit pixel electrode, and thus no black line is displayed between the high gray subpixel area and the low gray subpixel area. As a result, no luminance loss is generated.

In contrast, in the comparative example illustrated on the right side of FIG. 9, the high gray subpixel electrode includes one unit pixel electrode, while the low gray subpixel electrode includes two unit pixel electrodes. Although the low gray subpixel electrode is larger than the high gray subpixel electrode, and thus the low gray subpixel electrode includes two unit pixel electrodes, a relative small amount of texture may be generated. Accordingly, this case is selected as the comparative example. However, as illustrated on the right side of FIG. 9, a black line is generated at the center of the low gray subpixel area of the comparative example, thereby reducing the luminance. In this case, the central black line is generated between the two unit pixel electrodes. This central black line causes the luminance reduction, thereby deteriorating the display quality. Accordingly, the luminance characteristic of the experimental example can be more improved than the comparative example.

In the above experimental example, it was described that the transmittance can be improved by using one unit pixel electrode to form one subpixel electrode in the case of the pixel having a width of 140 μm or less, or the horizontal stem or the vertical stem having a width of 25 μm or less.

Hereinafter, the arrangement between adjacent pixel electrodes will be described.

Figure 10:
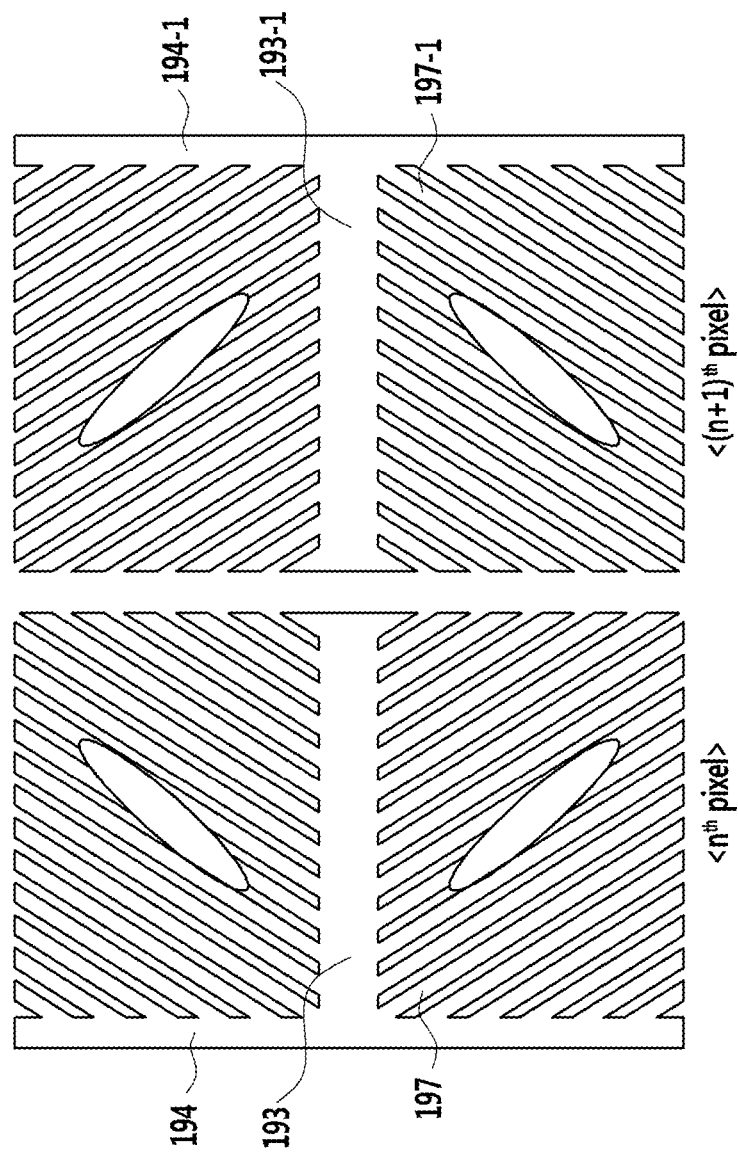
FIGS. 10 and 11 illustrate a structure of adjacent pixel electrodes according to an exemplary embodiment of the invention.
Figure 11:
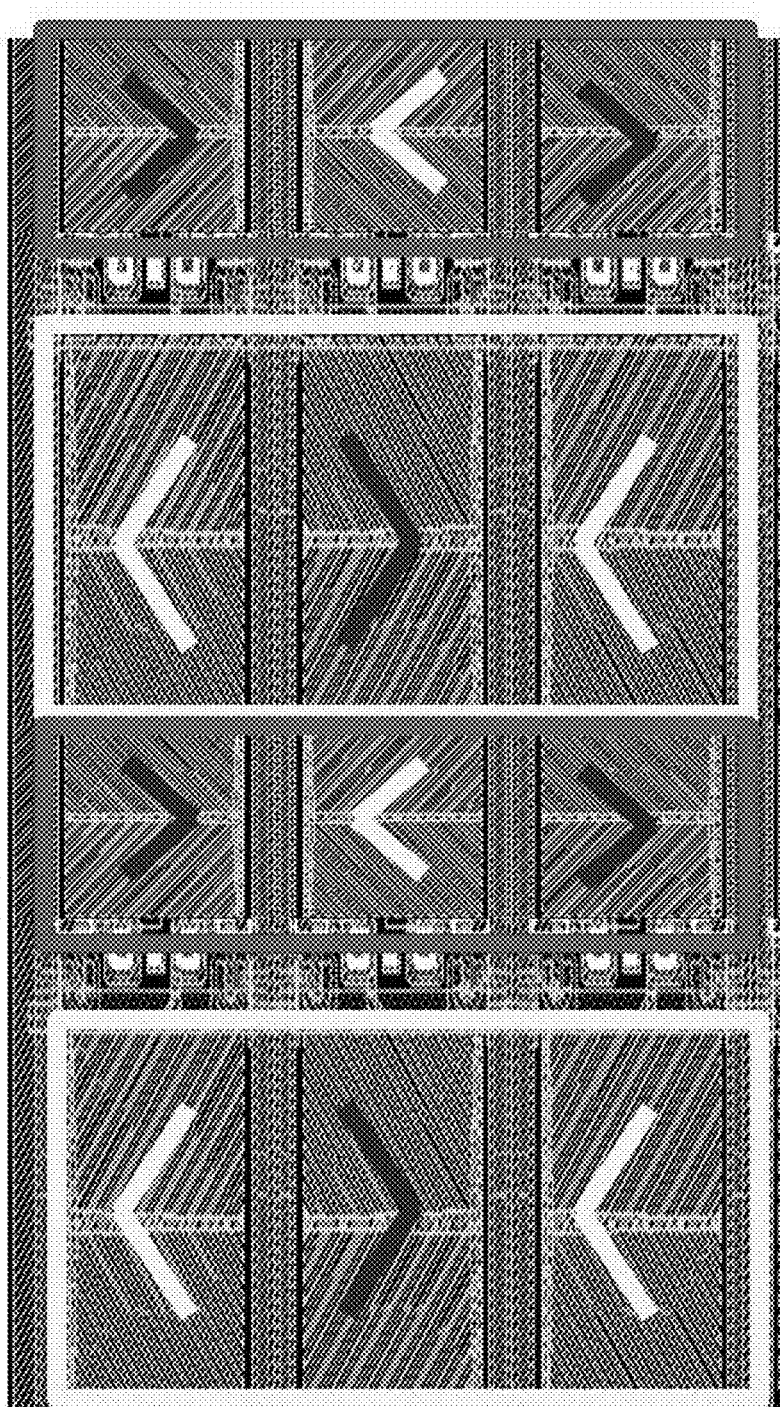

FIGS. 10 and 11 illustrate a structure of adjacent pixel electrodes according to an exemplary embodiment of the invention.

First, FIG. 10 illustrates an arrangement relationship of one subpixel electrode with another subpixel electrode that is adjacent thereto.

In the exemplary embodiment of FIG. 10, in a first subpixel electrode disposed at a left side ($n^{th}$-column pixel), a vertical stem 194 is disposed at the left side, and a horizontal stem 193 and minute branches 197 are disposed to extend from the left side toward a right side. In a second subpixel electrode disposed at the right side (($n+1)^{th}$-column pixel), a vertical stem 194-1 is disposed at the right side, and a horizontal stem 193-1 and minute branches 197-1 are disposed to extend from the right side toward the left side. This structure is referred to as a facing structure.

According to embodiments, the second subpixel electrode disposed at the right side (($n+1)^{th}$-column pixel) has a symmetrical structure with the first subpixel electrode disposed at a left side ($n^{th}$-column pixel). According to another exemplary embodiment, in the second subpixel electrode disposed at the right side (($n+1)^{th}$-column pixel), a vertical stem may be disposed at the left side, and a horizontal stem and minute branches are disposed to extend from the left side toward the right side. This structure is referred to as a same-directional structure. Since the same-directional structure is provided by repeating one pixel, no additional illustration thereof is provided Similarly, FIG. 11 illustrates a structure of adjacent pixels in the case of having the same facing structure as illustrated in FIG. 10.

The symbols "<" and ">" illustrated in FIG. 11 do not indicate a structure that substantially pertains to the pixel, but are added to clearly indicate the directions in which the subpixel electrodes are provided.

As shown in FIG. 11, each subpixel electrode has the facing structure of horizontally adjacent pixels. However, as described above, all the adjacent subpixel electrodes may have the same-directional structure.

Hereinafter, exemplary embodiments according to layer positions of the shielding electrode 199 will be described with reference to FIGS. 12 and 13.

Figure 13:
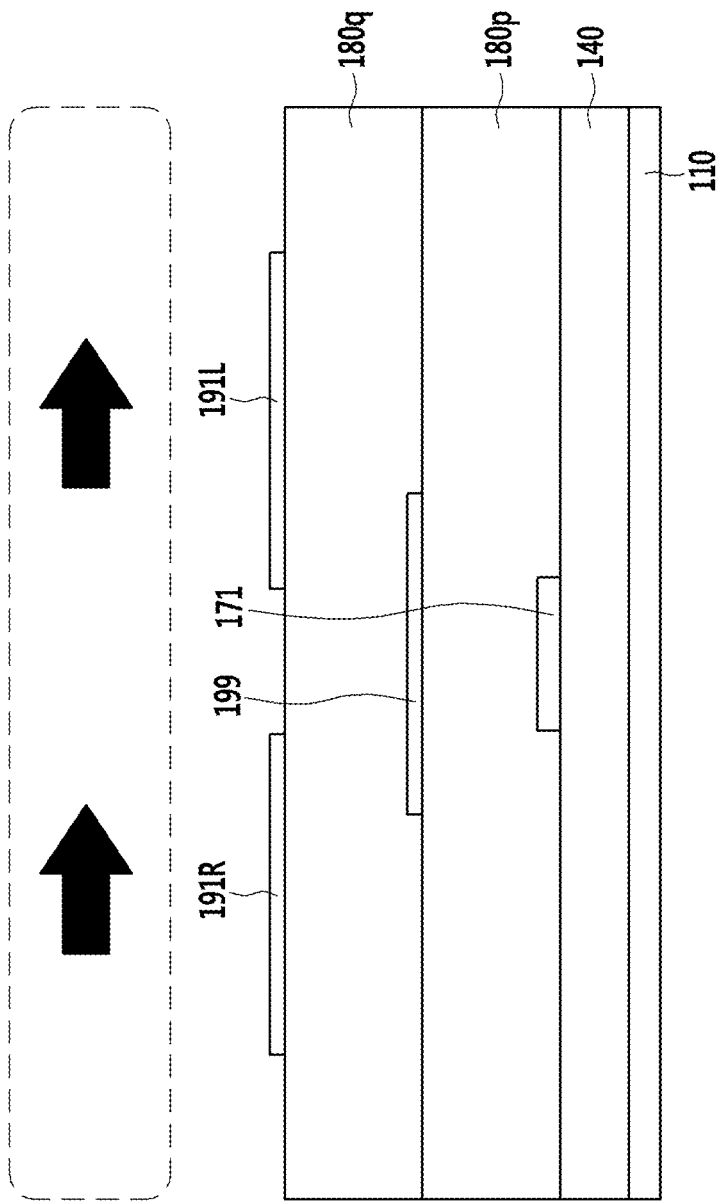

FIGS. 12 and 13 are cross-sectional views illustrating a region of a pixel according to exemplary embodiments of the invention.

In the exemplary embodiment of FIG. 12, pixel electrodes 191R and 191L and a shielding electrode 199 are provided in the same layer as in the exemplary embodiment of FIG. 1.

The structure of FIG. 12 will be described in brief.

A gate insulating layer 140 is covered on the lower insulation substrate 110. The data line 171 is disposed on the gate insulating layer 140. A passivation layer 180 is disposed on and to cover data line 171. The pixel electrodes 191R and 191L and the shielding electrode 199 are disposed on the passivation layer 180. The shielding electrode 199 is disposed above the data line 171, and is provided along an extending direction of the data line 171. The right pixel electrode 191R is disposed at a right side of the shielding electrode 199, and the left pixel electrode 191L is disposed at a left side of the shielding electrode 199.

In the exemplary embodiment of FIG. 12, the pixel electrodes 191R and 191L and the shielding electrode 199 are provided at the same layer, and thus a predetermined margin needs to be provided between the pixel electrodes 191R and 191L and the shielding electrode 199 to prevent short-circuit therebetween. In other words, a predetermined distance is generally maintained between the left pixel electrode 191L and the right pixel electrode 191R. Accordingly, although the alignment directions of the liquid crystal molecules positioned in adjacent pixel areas are different from each other, the liquid crystal molecules are less likely to affect each other. As a result, as shown in FIG. 12, although the liquid crystal molecules positioned in adjacent pixel areas are aligned in different directions, no problem is generated. In the exemplary embodiment of FIG. 12, when the liquid crystal molecules positioned at the adjacent pixel areas have the same alignment direction, no problem is generated either.

As illustrated in FIG. 13, the pixel electrodes 191R and 191L and the shielding electrode 199 are provided at different layers.

A structure illustrated in FIG. 13 will be described in brief.

A gate insulating layer 140 is coated on the lower insulation substrate 110. The data 171 is disposed on the gate insulating layer 140. The first passivation layer 180$p$ is disposed on and to cover the data line 171. The shielding electrode 199 is disposed on the first passivation layer 180$p$. The shielding electrode 199 is disposed above the data line 171, and is provided along an extending direction of the data line 171. The second passivation layer 180$q$ is disposed on and to cover the shielding electrode 199, and the pixel electrodes 191R and 191L are disposed on the second passivation layer 180$q$.

In the exemplary embodiment of FIG. 13, the pixel electrodes 191R and 191L and the shielding electrode 199 are provided at different layers. In an exemplary embodiment, the shielding electrode 199 is provided at a layer that is lower than the pixel electrodes 191R and 191L. In this case, even when the pixel electrodes 191R and 191L are overlapped with the shielding electrode 199, short-circuit is generated. Accordingly, a distance between the adjacent pixel electrodes can be reduced. As a result, when liquid crystal molecules positioned at two adjacent pixels are aligned in different directions, the liquid crystal molecules affect each other, thereby generating texture. Accordingly, in the exemplary embodiment of FIG. 13, the display quality can be improved by allowing the liquid crystal molecules positioned at two adjacent pixels to be aligned in the same direction.

The exemplary embodiment of the invention is related to the structure of the pixel electrode, and thus other structures may be varied. Hereinafter, various kinds of pixels are illustrated through the equivalent circuit diagrams of the pixels of FIGS. 14 to 17 and 20. Hereinafter, structures for differently adjusting voltage levels of two subpixel electrodes in various ways will be described through simple circuit diagrams.

First, an exemplary embodiment of FIG. 14 will be described.

Figure 14:
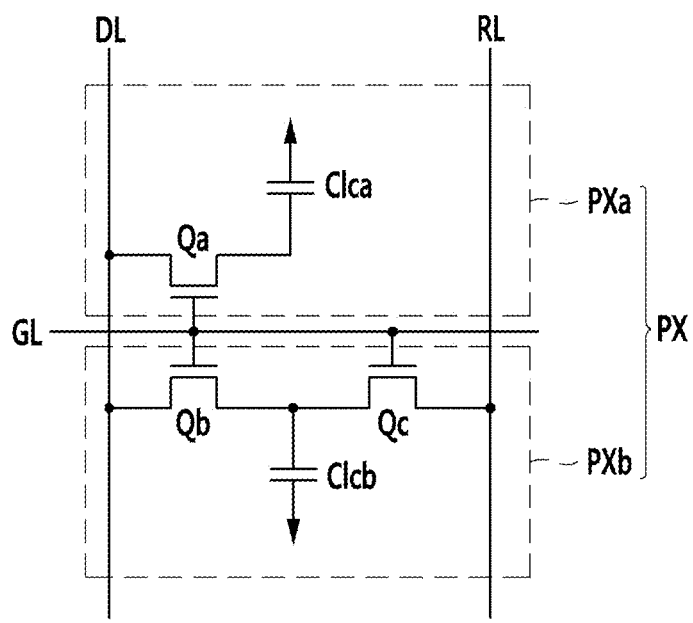
FIGS. 14 to 17 are equivalent circuit diagrams illustrating a pixel according to exemplary embodiments of the invention.

In FIG. 14, a circuit diagram of a pixel which applies different levels of voltages to two subpixel electrodes by using a reference voltage line RL described above is illustrated.

In FIG. 14, a high gray subpixel and a low gray subpixel are respectively indicated by PXa and PXb.

Referring to FIG. 14, an LCD according to an exemplary embodiment of the invention includes signal lines including the gate line GL, the data line DL, a reference voltage line RL transferring a reference voltage, and the like, and the pixel PX connected thereto.

Each pixel includes first and second subpixels PXa and PXb. The first subpixel PXa includes the first switching element Qa and the first liquid crystal capacitor Clca, and the second subpixel PXb includes the second and third switching elements Qb and Qc and the second liquid crystal capacitor Clcb. The first and second switching elements Qa and Qb are each connected to the gate line GL and the data line DL, and the third switching element Qc is connected to the output terminal of the second switching element Qb and the reference voltage line RL. The output terminal of the first switching element Qa is connected to the first liquid crystal capacitor Clca, and the output terminal of the second switching element Qb is connected to the second input liquid crystal capacitor Clcb and the input terminal of the third switching element Qc. The control terminal of the third switching element Qc is connected to the gate line GL, an input terminal thereof is connected to the second liquid crystal capacitor Clcb, and the output terminal thereof is connected to the reference voltage line RL.

An operation of the pixel PX shown in FIG. 14 will now be described. When a gate-on voltage Von is first applied to the gate line GL, the first, second, and third switching elements Qa, Qb, and Qc connected thereto are turned on. Accordingly, the data voltage applied to the data line DL is applied to the first liquid crystal capacitor Clca and the second liquid crystal capacitor Clcb, respectively, through the first switching element Qa and the second switching element Qb, which are turned on, and thus the first liquid crystal capacitor Clca and the second liquid crystal capacitor Clcb are charged in proportion to a difference between the data voltage and the common voltage. In this case, the same data voltage is transferred to the first liquid crystal capacitor Clca and the second liquid crystal capacitor Clcb through first and second switching elements Qa and Qb, but the charging voltage of the second liquid crystal capacitor Clcb is divided through the third switching element Qc. As a result, the charging voltage of the second liquid crystal capacitor Clcb is smaller than that of the first liquid crystal capacitor Clca, and thus the luminance of the two subpixels PXa and Pxb may be different. Accordingly, by appropriately adjusting the voltage of the first liquid crystal capacitor Clca and the voltage of the second liquid crystal capacitor Clcb, an image viewed from the side can be controlled to approach an image viewed from the front as closely as possible, thereby improving side visibility.

However, the pixel structure of the LCD according to the exemplary embodiment of the invention may be varied without being limited to the exemplary embodiment of FIG. 14.

Figure 15:
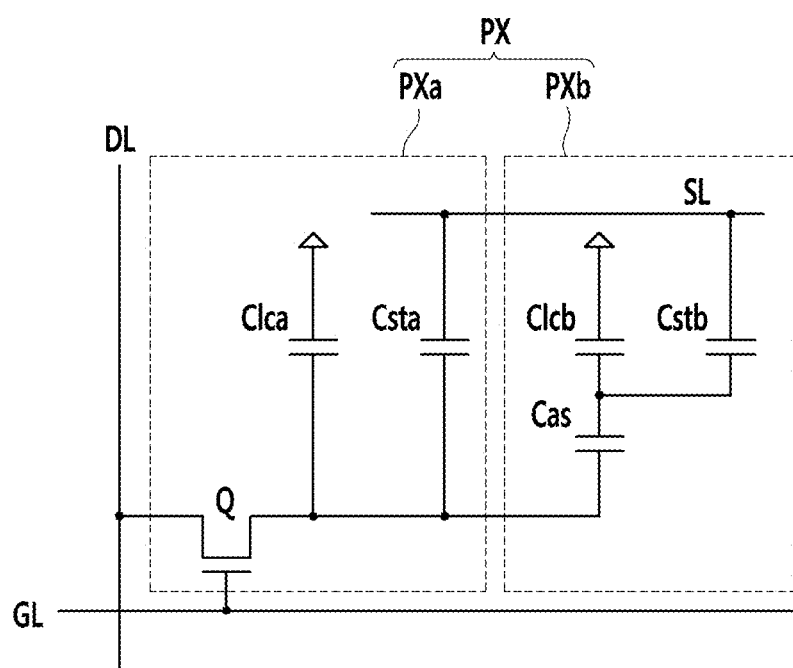

Hereinafter, an exemplary embodiment of FIG. 15 will be described.

An LCD according to the exemplary embodiment of the invention includes signal lines including a plurality of gate lines GL, a plurality of data lines DL, and a plurality of storage electrode lines SL, and a plurality of pixels PX connected thereto. Each pixel PX includes a pair of first and second subpixels PXa and PXb, a first subpixel electrode is provided in the first subpixel PXa, and a second subpixel electrode is provided in the second subpixel PXb.

The LCD according to the exemplary embodiment of the invention includes a switching element Q coupled to the gate line GL and the data line DL, a first storage capacitor Csta and a first liquid crystal capacitor Clca that are coupled to the switching element Q to be provided in the first subpixel PXa, a second liquid crystal capacitor Clcb and a second storage capacitor Cstb that are coupled to the switching element Q to be provided in the second subpixel PXb, and an auxiliary capacitor Cas that is provided between the switching element Q and the second liquid crystal capacitor Clcb.

The switching element Q is a three-terminal element such as a TFT or the like that is disposed in the lower display panel, a control terminal thereof is connected to the gate line GL, an input terminal thereof is coupled to the data line DL, and an output terminal thereof is connected to the first liquid crystal capacitor Clca, the first storage capacitor Csta, the auxiliary capacitor Cas.

One terminal of the auxiliary capacitor Cas is connected to the output terminal of the switching element Q, and the other terminal thereof is connected to the second liquid crystal capacitor Clcb and the second storage capacitor Cstb.

The charged voltage of the second liquid crystal capacitor Clcb is lower than the charged voltage of the first liquid crystal capacitor Clca through the action of the auxiliary capacitor Cas, thereby improving the side visibility of the LCD.

Figure 16:
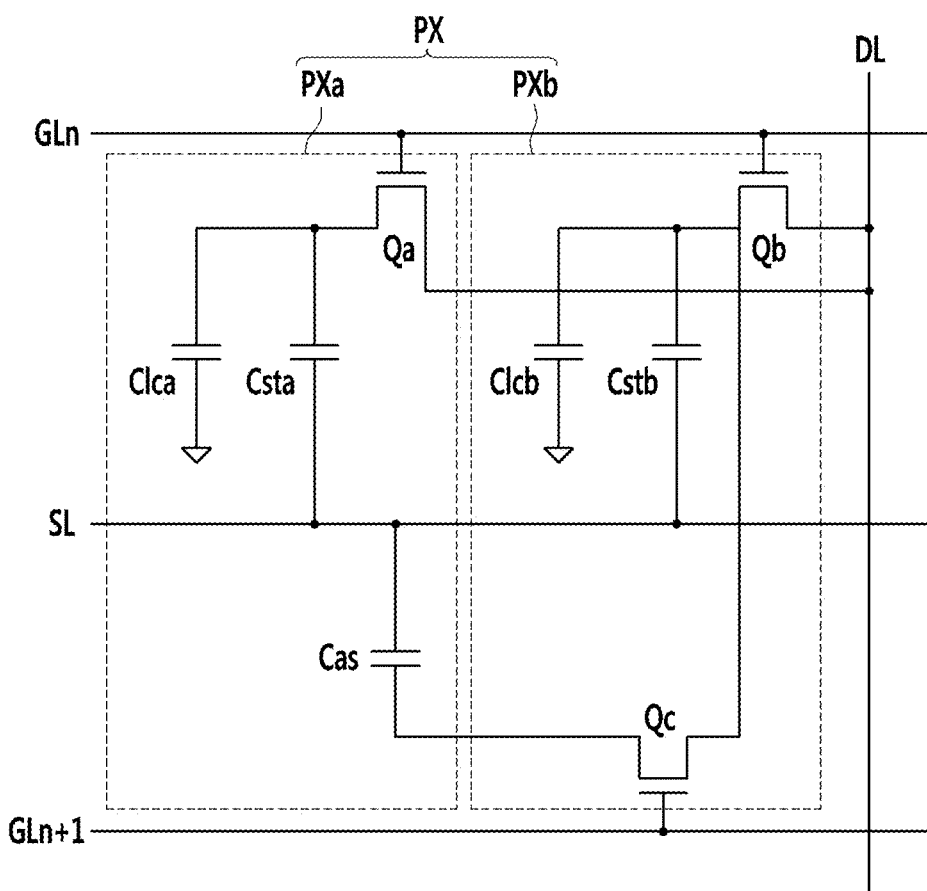

Hereinafter, an exemplary embodiment of FIG. 16 will be described.

An LCD according to the exemplary embodiment of the invention includes signal lines including a plurality of gate lines GLn and GL(n+1), a plurality of data lines DL, and a plurality of storage electrode lines SL, and a plurality of pixels PX connected thereto. Each pixel PX includes a pair of first and second subpixels PXa and PXb, a first subpixel electrode is provided in the first subpixel PXa, and a second subpixel electrode is provided in the second subpixel PXb.

The LCD according to the exemplary embodiment of the invention further includes a first switching element Qa and a second switching element Qb connected to the gate line GLn and the data line DL, a first liquid crystal capacitor Clca connected to the first switching element Qa to be provided in a first subpixel PXa, a second liquid crystal capacitor Clcb connected to the first storage capacitor Csta and the second switching element Qb to be provided in a second subpixel PXb, a third switching element Qc which is connected to the second switching element Qc and is switched by the gate line GL(n+1) in the next stage, and an auxiliary capacitor Cas which is connected to the third switching element Qc.

The first switching element Qa and the second switching element Qb are three terminal elements, such as TFTs which are disposed in the lower display panel, control terminals are connected to the gate line GLn, input terminals are connected to the data line DL, and output terminals are connected to the first liquid crystal capacitor Clca and the first storage capacitor Csta, and the second liquid crystal capacitor Clcb and the second storage capacitor Cstb, respectively.

The third switching element Qc is also a three terminal element such as a TFT which is provided in the lower display panel 100, a control terminal is connected to the gate line GL(n+1) of the next stage, and an input terminal is connected to the second liquid crystal capacitor Clcb, and an output terminal is connected to the auxiliary capacitor Cas.

One terminal of the auxiliary capacitor Cas is connected to the output terminal of the third switching element Qc and the other terminal is connected to the storage capacitor SL.

An operation of the LCD according to the exemplary embodiment of the invention will be described. When a gate-on voltage is applied to the gate line GLn, the first switching element Qa and the second switching element Qb, which are connected thereto, are turned on, and the data voltage of the data line 171 is applied to the first and second subpixel electrodes.

Next, when a gate-off voltage is applied to the gate line GLn and a gate-on voltage is applied to the gate line GL(n+1) of the next stage, the first and second switching elements Qa and Qb are turned off and the third switching element Qc is turned on. As a result, charges of the second subpixel electrode which is connected to the output terminal of the second switching element Qb flows into the auxiliary capacitor Cas so that the voltage of the second liquid crystal capacitor Clcb is lowered.

As such, the side visibility of the LCD may be improved by differently adjusting the charged voltages of the first and second liquid crystal capacitors Clca and Clcb.

Next, an exemplary embodiment of FIG. 17 will be described.

An LCD according to the exemplary embodiment of the invention includes signal lines including a plurality of gate lines GL, a plurality of data lines DL1 and DL2, and a plurality of storage electrode lines SL and a plurality of pixels PX connected thereto. Each pixel PX includes a pair of first and second liquid crystal capacitors Clca and Clcb and first and second storage capacitors Csta and Cstb.

Each subpixel includes one liquid crystal capacitor and one storage capacitor and further includes one TFT Q. The TFTs Q of two subpixels in one pixel are connected to the same gate line GL, but connected to different data lines DL1 and DL2. The different data lines DL1 and DL2 simultaneously apply different levels of data voltages so that the first and second liquid crystal capacitors Clca and Clcb of the two pixels have different charging voltages. As a result, the side visibility of the LCD may be improved.

An exemplary embodiment of the invention corresponding to the exemplary embodiment of FIG. 17 will be described in detail with reference to FIGS. 18 and 19 before a pixel structure is described with reference to FIG. 20.

Figure 17:
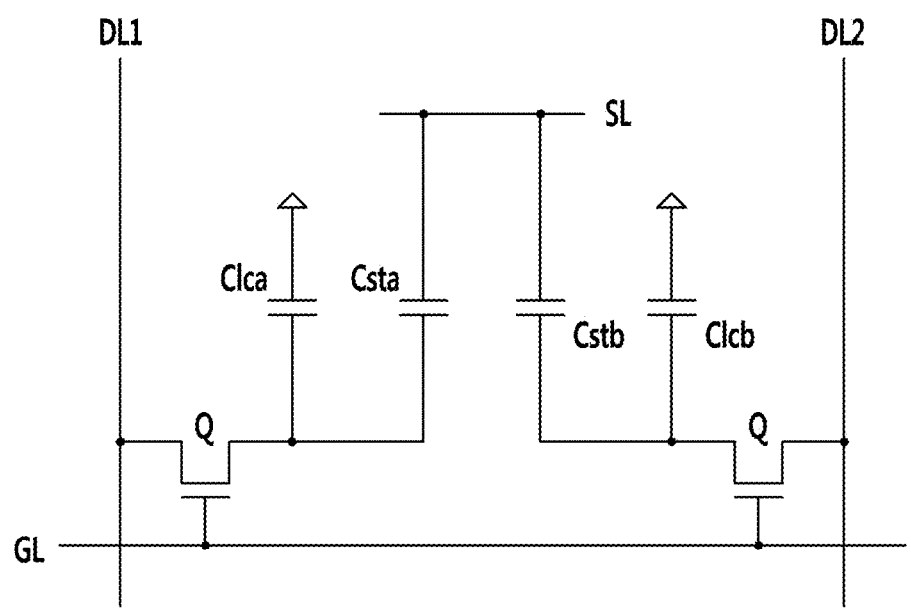
Figure 18:
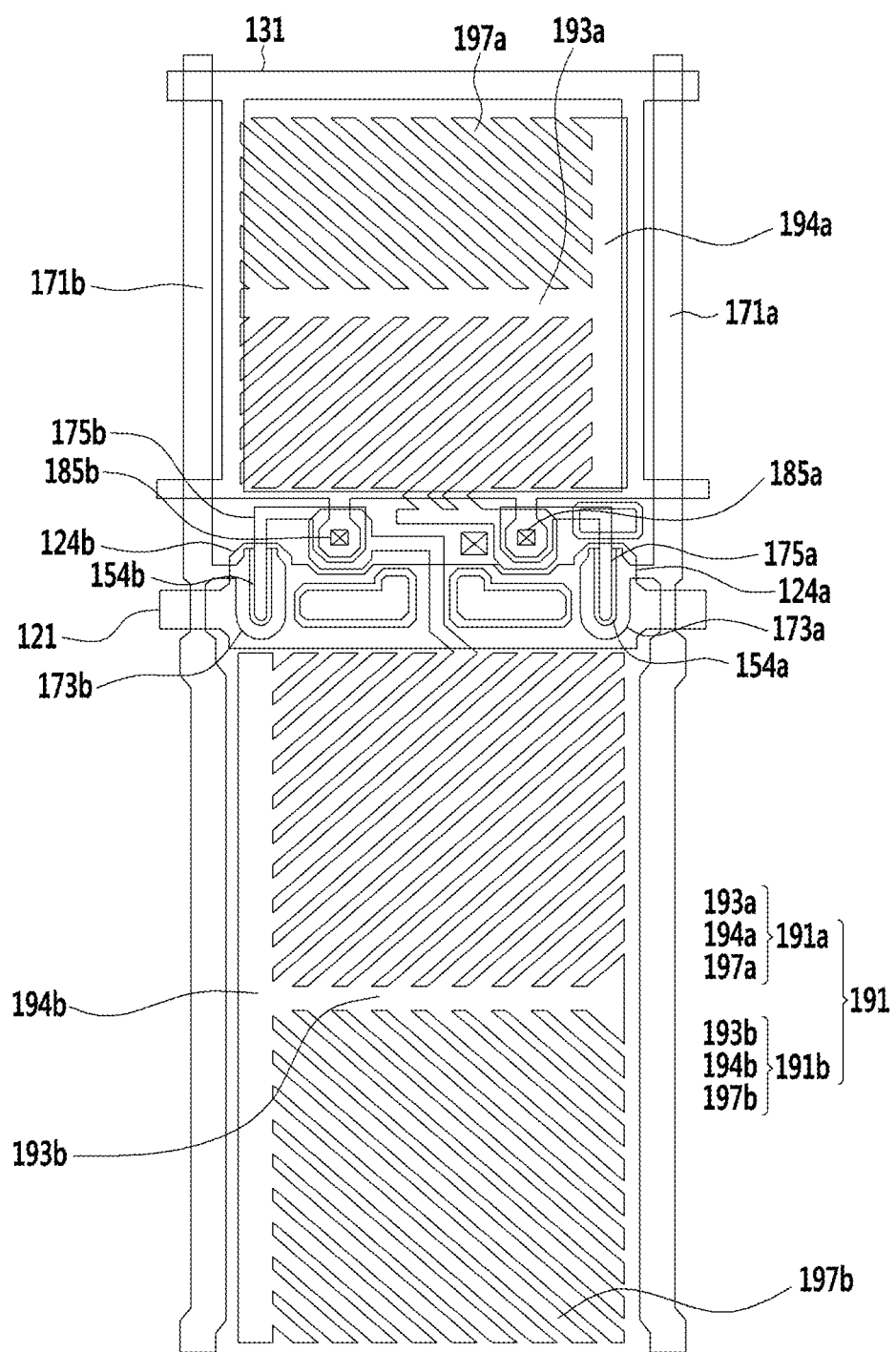
FIG. 18 is a schematic diagram of a pixel according to the exemplary embodiment of FIG. 17.

FIG. 18 is a schematic diagram of a pixel according to the exemplary embodiment of FIG. 17.

In the exemplary embodiment of FIG. 18, a gate conductor including a gate line 121 and a storage electrode line 131 is disposed on a first insulation substrate including transparent glass or plastic. The gate line 121 includes gate electrodes 124a and 124b and a wide gate pad (not illustrated) for contact with another layer or an external driving circuit.

The gate line 121 is disposed to traverse a pixel area in an extending direction of rows. A pair of subpixel electrodes for displaying different grays is disposed at opposite ends of the gate line 121. In the exemplary embodiment of FIG. 18, the first subpixel electrode 191a for displaying a high gray is disposed above the gate line 121, and the second subpixel electrode 191b for displaying a low gray is disposed below the gate line 121.

The storage electrode line 131 may include the same material as that of the gate line 121, and may be provided by using the same process as that of the gate line 121.

The first storage electrode line 131 disposed above the gate line 121 may have such a quadrangular shape so as to surround the first subpixel electrode 191a. An upper side and a lower side of the quadrangular shaped first storage electrode line 131 may be out of one pixel area so as to horizontally extend to be connected to another layer or an external driving circuit. Further, the lower side of the first storage electrode line 131 has an extending structure that is downwardly extended to a first contact hole 185a. This extending structure may not be included according to another exemplary embodiment.

On the gate conductor, the gate conductor is covered by a gate insulating layer 140 (refer to FIG. 2). A conduct hole is defined at a portion of the gate conductor which corresponds to the gate pad (not illustrated) to expose the gate pad. The portions of the gate conductor other than the conduct hole may be covered by the gate insulating layer 140.

Semiconductor layers including a first semiconductor layer 154a and a second semiconductor layer 154b are disposed on the gate insulating layer 140. The semiconductor layers other than the first semiconductor layer 154a and the second semiconductor layer 154b are disposed below the region at which a data conductor including first and second data lines 171a and 171b, first and second source electrodes 173a and 173b, and first and second drain electrodes 175a and 175b is disposed. This structure is provided in the case that a semiconductor layer is etched together with a data conductor when the data conductor is etched, the first semiconductor layer 154a and the second semiconductor layer 154b forming a channel of the TFT are disposed to correspond to a photoresist corresponding to a transflective region or a slit region on a mask.

The semiconductor layer may include an amorphous silicon semiconductor, an oxide semiconductor, or a polycrystalline semiconductor.

A plurality of ohmic contacts (not illustrated) may be disposed on the semiconductors other than the first semiconductor layer 154a and the second semiconductor layer 154b, and may be omitted when the semiconductor layer includes an oxide semiconductor.

A data conductor is disposed on the ohmic contacts.

The data conductor includes first and second data lines 171a and 171b, a first source electrode 173a, a second source electrode 173b, a first drain electrode 175a, and a second drain electrode 175b.

The first and second data lines 171a and 171b are extended along left and right edges of one pixel area in an extending direction, and each includes the first source electrode 173a and the second source electrode 173b. The first source electrode 173a and the second source electrode 173b may have a U-shape, but are not limited thereto.

The data line 171 includes a wide data pad (not illustrated) for connection with another layer or an external driving circuit.

The first drain electrode 175a is disposed to face the first source electrode 173a and has, for example, an I-shape corresponding to the U-shaped first source electrode 173a, and includes a widely expanded region that is connected to the first subpixel electrode 191a.

Similarly, the second drain electrode 175b is disposed to face the second source electrode 173b and has, for example, an I-shape corresponding to the U-shaped second source electrode 173b, and includes a widely expanded region that is connected to the second subpixel electrode 191b.

The data conductor, the ohmic contacts, and the semiconductor layer may be simultaneously provided by using one mask.

The first gate electrode 124a, the first source electrode 173a, and the first drain electrode 175a constitute one first TFT Qa together with the first semiconductor layer 154a, and a channel of the first TFT is defined at the first semiconductor layer 154a disposed between the first source electrode 173a and the first drain electrode 175a. Similarly, the second gate electrode 124b, the second source electrode 173b, and the second drain electrode 175b constitute one second TFT Qb together with the second semiconductor layer 154b, and a channel is defined at the second semiconductor layer 154b between the second source electrode 173b and the second drain electrode 175b.

A first passivation layer is disposed on the data conductor and the exposed semiconductor layers 154a and 154b. In an exemplary embodiment, the first passivation layer may include a silicon nitride, a silicon oxide, or the like that is used to form an inorganic insulating layer, for example. The second passivation layer is disposed on the first passivation layer 180p, and may include an organic material, unlike the first passivation layer. According to another exemplary embodiment, one of the first passivation layer and the second passivation layer may be omitted. According to another exemplary embodiment, a color filter may be disposed at the position of the second passivation layer. In this case, the first passivation layer 180p may serve to prevent a pigment of the color filter from flowing into the exposed semiconductor layers 154a and 154b. Even when the color filter is disposed, the second passivation layer may be provided to cover the color filter.

A first contact hole 185a and a second contact hole 185b are defined in the first and second passivation layers to expose the first and second drain electrodes 175a and 175b, respectively.

First and second subpixel electrode 191a and 191b may be disposed on the second passivation layer.

The first and second subpixel electrode 191a and 191b may be separately disposed with the gate line 121 therebetween to be adjacent to each other in the column direction. The first subpixel electrode 191a is disposed in the high gray subpixel area, and the second subpixel electrode 191b is disposed in the low gray subpixel area.

The first subpixel electrode 191a and the second subpixel electrode 191b respectively include one horizontal stem 193a and 193b, and one vertical stem 194a and 194b, and further include a plurality of minute branches 197a and 197b which is obliquely extended therefrom.

In this case, the minute branches 197a are arranged in two directions, and thus the first subpixel electrode 191a or the second subpixel electrode 191b has two domains. The structure of the first subpixel electrode 191a or the second subpixel electrode 191b including two domains is referred to as one unit pixel electrode.

As illustrated in FIG. 18, the low gray subpixel area is about 1.5 times to about 2.5 times larger than the high gray subpixel area. As such, although the two subpixel areas are different from each other, one horizontal stem and one vertical stem are provided in each of the two subpixel areas according to the exemplary embodiment of the invention. In other words, according to an exemplary embodiment of the invention, the first and second subpixel electrodes 191a and 191b respectively include the minute branches 197a and 197b, each of which is arranged in two directions, and thus each includes two domains. These two domains are fewer than the four the domains of one general subpixel electrode.

Although the pixel size gets smaller in a higher resolution LCD, a predetermined number of minute branches or stems may be provided to have a predetermined size. In the exemplary embodiment of the invention, one stem is provided in one subpixel area, and thus the texture generated in the pixel area can be controlled, display errors can be reduced, and light transmittance can be improved.

Further, in the case of providing a curved display device, it is possible to reduce display errors caused by misalignment between upper and lower substrates through the pixel electrode that is extended from the horizontal stem. As a result, the LCD according to the exemplary embodiment of the invention can be applied to a curved LCD having a curved structure as well as a general LCD having a flat structure. In particular, the LCD according to the exemplary embodiment of the invention has relatively further improved characteristics in the curved structure compared to other pixel structures.

In an exemplary embodiment, the first and second subpixel electrodes 191a and 191b may include a transparent material such as ITO and IZO.

An upper display panel will now be described. Although not illustrated, the upper display panel is a constituent element that is required to accommodate a liquid crystal layer in the LCD. However, in an LCD including an additional structure for accommodating the liquid crystal layer, the upper display panel may be omitted.

The upper display panel included in an LCD will be described.

A light blocking member (not illustrated) is disposed on a second insulation substrate (not illustrated) disposed to face a first insulation substrate 110 including transparent glass, plastic, or the like. The light blocking member is also referred to as a black matrix and prevents light leakage. The light blocking member which is described to be disposed in the upper display panel may be disposed in a lower display panel according to another exemplary embodiment.

In the exemplary embodiment, the light blocking member may be disposed to extend along the data line 121 and the first and second data lines 171a and 171b in an extending direction of columns.

A plurality of color filters (not illustrated) is also disposed on the second insulation substrate.

An overcoat (not illustrated) may be disposed on the color filters and the light blocking member. In an exemplary embodiment, the overcoat may include an organic insulator, to serve to remove steps caused by the color filters and the light blocking member and provide a flat surface. In another exemplary embodiment, the overcoat may be omitted.

A common electrode 270 (refer to FIG. 8) is disposed on the overcoat. The common electrode 270 may include the same material as that of the pixel electrode 191 (refer to FIG. 8), and may be provided in a flat surface type to receive a common voltage.

Further, an alignment layer (not illustrated) may be disposed inside the pixel electrode 191 and the common electrode 270.

A liquid crystal layer (not illustrated) may be disposed inside the alignment layer between the lower display panel and the upper display panel. In an exemplary embodiment, the liquid crystal layer has negative dielectric anisotropy, and liquid crystal molecules of the liquid crystal layer are aligned such that long axes thereof are perpendicular to surfaces of the upper and lower display panels in a state in which no electric field is generated.

The first and second subpixel electrodes 191a and 191b to which the data voltage is applied generate an electric field along with the common electrode 270 of the upper display panel 200, thereby determining the alignment directions of the liquid crystal molecules of the liquid crystal layer interposed between the two electrodes 191 and 270. Depending on the determined directions of the liquid crystal molecules, a phase difference of light passing through the liquid crystal layer is varied, and thus an amount of light passing through the polarizer is adjusted to control display luminance.

In the above exemplary embodiments, the pixel structure of the LCD in which one horizontal stem 193b and one vertical stem 194b are provided even in the low gray subpixel area was described.

Hereinafter, adjacent pixels will be described with reference to FIG. 19.

Figure 19:
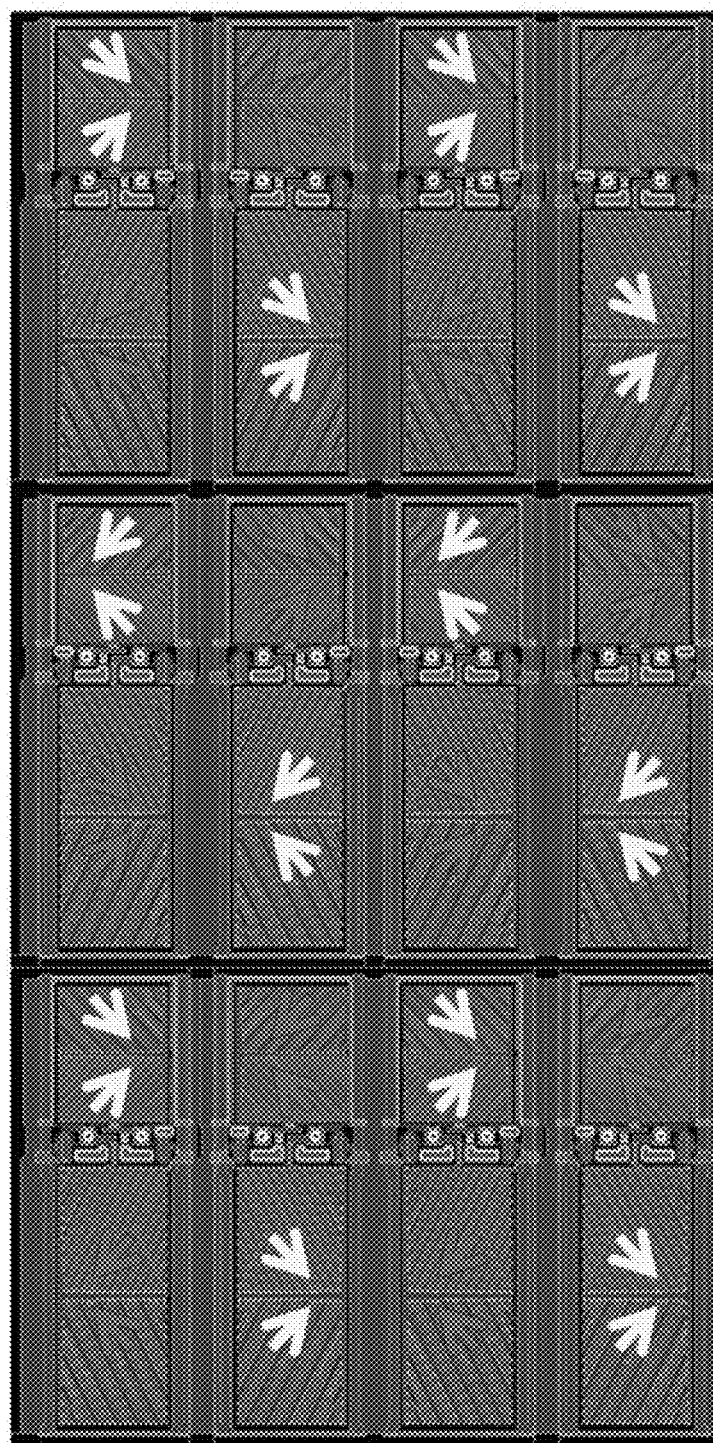
FIG. 19 is a plan view of a pixel according to the exemplary embodiment of FIG. 18.

FIG. 19 is a plan view of a pixel according to the exemplary embodiment of FIG. 18.

Additional arrows illustrated in FIG. 19 indicate alignment directions of the liquid crystal molecules, and the adjacent pixels have a facing structure to face each other.

Although the facing structure is illustrated in FIG. 19, the adjacent pixels may have a same-directional structure.

Hereinafter, an equivalent circuit of a pixel in which different voltages are applied to two subpixel electrodes according to an exemplary embodiment will be described with reference to FIG. 20.

Figure 20:
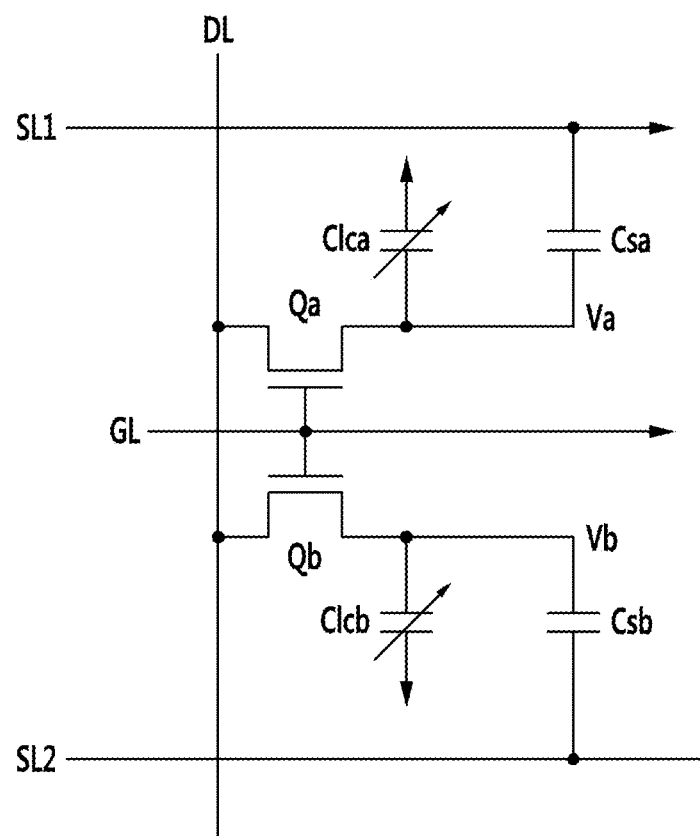
FIG. 20 is an equivalent circuit diagram illustrating an exemplary embodiment of a pixel according to the invention.

The LCD according to an exemplary embodiment of the invention, as shown in FIG. 20, includes a gate line GL, a data line DL, a first power line SL1, a second power line SL2, and a first switching element Qa and a second switching element Qb, which are connected to the gate line GL and the data line DL.

The LCD according to an exemplary embodiment of the invention further includes an auxiliary step-up capacitor Csa which is connected to the first switching element Qa, a first liquid crystal capacitor Clca, an auxiliary step-down capacitor Csb which is connected to the second switching element Qb, and a second liquid crystal capacitor Clcb.

The first switching element Qa and the second switching element Qb include three terminal elements such as TFTs. The first switching element Qa and the second switching element Qb are connected to the same gate line GL and the same data line DL to be turned on at the same time, thereby outputting the same data signal.

A voltage which swings with a predetermined period is applied to the first power line SL1 and the second power line SL2. A first low voltage is applied to the first power line SL1 during a predetermined period (e.g., one horizontal period 1H) and a first high voltage is applied thereto during a next predetermined period. A second high voltage is applied to the second power line SL2 during a predetermined period and a second low voltage is applied thereto during a next predetermined period. In this case, the first period and the second period are repeated multiple times for one frame so that a swinging voltage is applied to the first power line SL1 and the second power line SL2. In this case, the first low voltage is equal to the second low voltage and the first high voltage is equal to the second high voltage.

The auxiliary step-up capacitor Csa is connected to the first switching element Qa and the first power line SL1, and the auxiliary step-down capacitor Csb is connected to the second switching element Qb and the second power line SL2.

A voltage Va of a terminal (hereinafter, referred to as a "first terminal") at a portion at which the auxiliary step-up capacitor Csa is connected to the first switching element Qa is lowered when the first low voltage is applied to the first power line SL1 and rises when the first high voltage is applied. Thereafter, the voltage Va of the first terminal swings as a voltage of the first power line SL1 swings.

Similarly, a voltage Vb of a terminal (hereinafter, referred to as a "second terminal") at a portion at which the auxiliary step-up capacitor Csb is connected to the second switching element Qb is lowered when the second high voltage is applied to the second power line SL2 and rises when the second high voltage is applied. Thereafter, the voltage Vb of the second terminal swings as a voltage of the second power line SL2 swings.

As such, although the same data voltage is applied to two sub-pixels, the voltages Va and Vb of the pixel electrodes of two sub-pixels are varied according to the magnitude of the voltages swung in the first and second power lines SL1 and SL2, and thus the transmittance of the two sub-pixels is controlled differently, thereby improving the side visibility.

In the above, various exemplary embodiments of the invention were described.

In the above LCDs, the unit pixel electrode pertaining to the pixel electrode has the minute branches 197, and since the number of unit pixel electrodes is high, the number of the minute branches 197 is high. As a result the liquid crystal control force to control the liquid crystal molecule may be sufficiently obtained, and thus a prepolymer polymerized by light may not be additionally included in the liquid crystal layer.

However, according to another exemplary embodiment, the liquid crystal control force may be partially decreased, and thus the prepolymer may be included in the liquid crystal layer.

A method of forming the pretilt in the case of including the prepolymer will be described with reference to FIG. 21.

Figure 21:
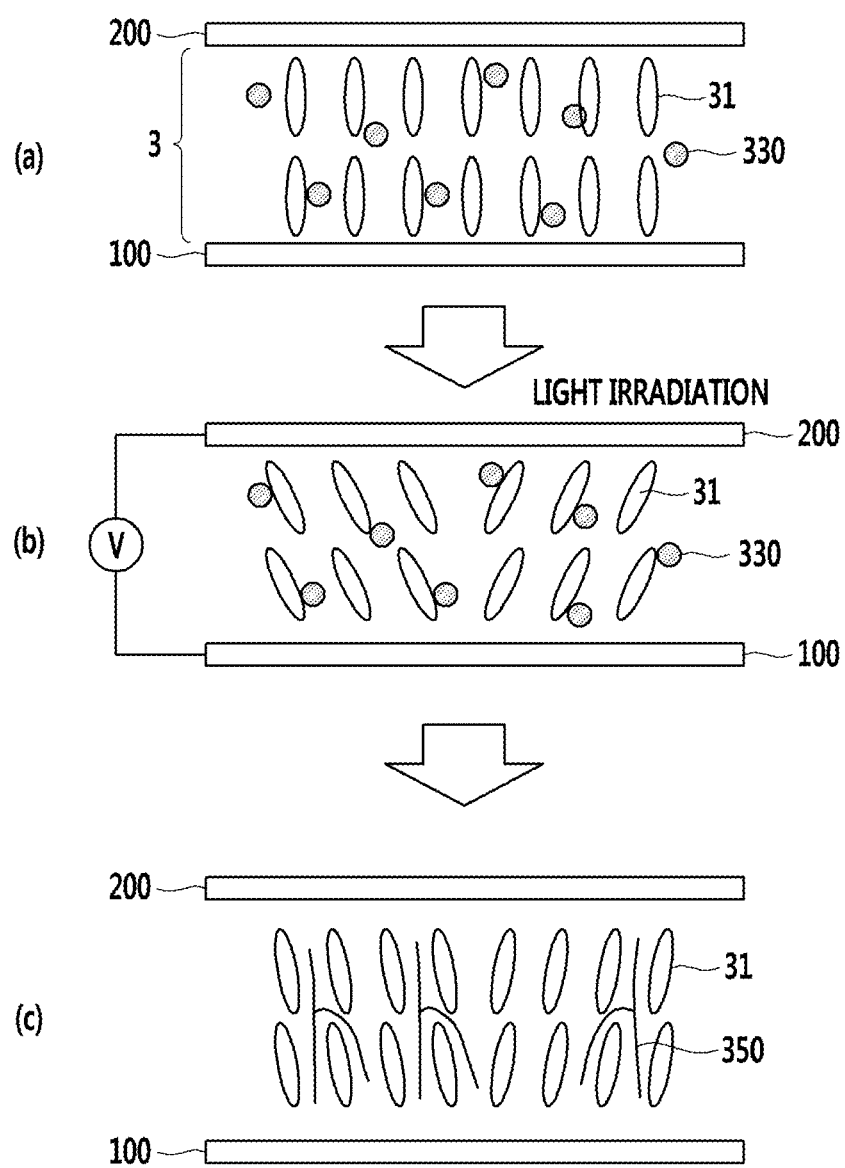
FIG. 21 illustrates a process for providing a pretilt to liquid crystal molecules by using prepolymers that are polymerized by light such as ultraviolet rays.

FIG. 21 illustrates a process for providing a pretilt to liquid crystal molecules by using prepolymers that are polymerized by light such as ultraviolet rays.

Referring to FIG. 21, prepolymers 330 such as a monomer that is polymerized by light such as ultraviolet rays are first injected along with a liquid crystal material between the two display panels 100 and 200. The prepolymer 330 may be a reactive mesogen that is polymerized by light such as ultraviolet rays.

Next, an electric field is generated at the liquid crystal layer 3 between two display panels 100 and 200 by respectively applying a data voltage and a common voltage to the first and second subpixel electrodes and the common electrode 270 of the upper display panel 200. Thus, liquid crystal molecules 31 of the liquid crystal layer 3 are inclined in a predetermined direction in response to the electric field.

As such, when light from ultraviolet rays is irradiated in the state that the liquid crystal molecules 31 of the liquid crystal layer 3 are inclined in the predetermined direction, the prepolymer 330 is polymerized, and thus a pretilt providing polymer 350 is provided as shown in FIG. 21. The pretilt providing polymer 350 contacts the display panels 100 and 200. Alignment directions of the liquid crystal molecules 31 are determined such that the liquid crystal molecules 31 have pretilt as in the aforementioned directions. Accordingly, the liquid crystal molecules 31 are arranged to have pretilt corresponding to four different directions even in a state in which a voltage is not applied to the field generating electrodes 191 and 270 (refer to FIG. 8).

As a result, the liquid crystal molecules 31 have the pretilt of four directions in each region of the upper and lower subpixels of one pixel.

The pretilt using the polymer as shown in FIG. 21 is additionally used in the case that the texture is not reduced through the control for the liquid crystal control force provided by the minute branches 197 (refer to FIG. 8).

The exemplary embodiment of FIG. 21 has been described based on the case that the liquid crystal layer includes a photo-reactive material, but this is true of the case that the alignment layer may include the photo-reactive material.

While this invention has been described in connection with what is presently considered to be practical exemplary embodiments, it is to be understood that the invention is not limited to the disclosed embodiments but, on the contrary, is intended to cover various modifications and equivalent arrangements included within the spirit and scope of the appended claims.

What is claimed is:

1. A display device, comprising:
a first substrate;
a first gate line and a second gate line, which are disposed on the first substrate and separated from each other in a first direction;
a first data line and a second data line, which cross the first gate line and the second gate line;
a first thin film transistor connected to the first gate line;
a second thin film transistor connected to the second gate line; and
a pixel electrode layer disposed over the first substrate,
wherein the pixel electrode layer comprises a plurality of unit electrodes arranged in the first direction, and unit electrodes of the plurality of unit electrodes of the pixel electrode layer disposed between the first gate line and the second gate line in a plan view is divided into two portions, which are a first portion and a second portion,
the first portion consists of two domains, which are a first domain and a second domain,
the second portion consists of two domains, which are a third domain and a fourth domain,
the first portion includes:
a first vertical stem at an edge of the first portion;
a first horizontal stem connected to the first vertical stem;
first upper branches, which are disposed in the first domain and extend from the first horizontal stem; and
first lower branches, which are disposed in the second domain and extend from the first horizontal stem and in a direction different from an extending direction of the first upper branches, and
the second portion includes:
a second vertical stem at an edge of the second portion;
a second horizontal stem connected to the second vertical stem;
second upper branches, which are disposed in the third domain and extend from the second horizontal stem; and
second lower branches, which are disposed in the fourth domain and extend from the second horizontal stem and in a direction different from an extending direction of the second upper branches,
wherein the display device further comprises a storage line including an extending portion disposed between the first portion and the second portion, and the storage line is not directly connected to any transistor.

2. The display device of claim 1, further comprising:
a second substrate overlapping the first substrate;
a liquid crystal layer between the first substrate and the second substrate and includes a plurality of liquid crystal molecules; and
a common electrode between the liquid crystal layer and the second substrate,
wherein:
the first and second domains of the first portion have different alignment directions of the plurality of liquid crystal molecules from each other, and
the third and fourth domains of the second portion have different alignment directions of the plurality of liquid crystal molecules from each other.

3. The display device of claim 2, wherein:
the first horizontal stem is connected to a center of the first vertical stem,
the second horizontal stem is connected to a center of the second vertical stem, and
the first upper branches, the first lower branches, the second upper branches, and the second lower branches extend in an oblique direction with respect to the first direction.

4. The display device of claim 1, wherein
the first vertical stem is disposed at a right edge of the first portion, and the second vertical stem is disposed at a left edge of the second portion.

5. The display device of claim 1, wherein
a portion of the first lower branches protrudes out than the rest of the first lower branches.

6. The display device of claim 5, wherein
a portion of the second upper branches protrudes out than the rest of the second upper branches.

7. A display device, comprising:
a first substrate;
a first gate line and a second gate line, which are disposed on the first substrate and separated from each other in a first direction;
a first data line and a second data line, which cross the first gate line and the second gate line;
a first thin film transistor connected to the first gate line;
a second thin film transistor connected to the second gate line; and
a pixel electrode layer disposed over the first substrate,
wherein the pixel electrode layer comprises a plurality of unit electrodes arranged in the first direction, and unit electrodes of the plurality of unit electrodes of the pixel electrode layer disposed between the first gate line and the second gate line in a plan view is divided into two portions, which are a first portion and a second portion,
the first portion has only two domains, which are a first domain and a second domain,
the second portion has only two domains, which are a third domain and a fourth domain, the first portion includes:
a first vertical stem at an edge of the first portion;
a first horizontal stem connected to the first vertical stem;
first upper branches, which are disposed in the first domain and extend from the first horizontal stem; and
first lower branches, which are disposed in the second domain and extend from the first horizontal stem and in a direction different from an extending direction of the first upper branches, and the second portion includes:
a second vertical stem at an edge of the second portion;
a second horizontal stem connected to the second vertical stem;
second upper branches, which are disposed in the third domain and extend from the second horizontal stem; and
second lower branches, which are disposed in the fourth domain and extend from the second horizontal stem and in a direction different from an extending direction of the second upper branches, wherein the display device further comprises a storage line including an extending portion disposed between the first portion and the second portion, and the storage line is not directly connected to any transistor.

8. A display device comprising:
a first substrate;
a first gate line disposed on the first substrate;
a first data line crossing the first gate line;
a first thin film transistor connected to the first gate line and the first data line; and
a plurality of pixel electrodes, wherein adjacent pixel electrodes of the plurality of pixel electrodes in a first direction and a second direction in a display area of the first substrate have a same structure as each other,
wherein:
an entire area of the pixel electrode is divided into a first portion and a second portion,
the first portion is connected to the first thin film transistor, and consists of a first domain and a second domain,
the second portion consists of a third domain and a fourth domain,
the first portion includes:
a first vertical stem at an edge of the first portion;
a first horizontal stem connected to the first vertical stem;
first upper branches, which are disposed in the first domain and extend from the first horizontal stem; and
first lower branches, which are disposed in the second domain and extend from the first horizontal stem and in a direction different from an extending direction of the first upper branches, and the second portion includes:
a second vertical stem at an edge of the second portion;
a second horizontal stem connected to the second vertical stem;
second upper branches, which are disposed in the third domain and extend from the second horizontal stem; and
second lower branches, which are disposed in the fourth domain and extend from the second horizontal stem and in a direction different from an extending direction of the second upper branches, wherein the display device further comprises a storage line including an extending portion disposed between the first portion and the second portion, and the storage line is not directly connected to any transistor.

9. The display device of claim 8, further comprising:
a second substrate overlapping the first substrate;
a liquid crystal layer between the first substrate and the second substrate and includes a plurality of liquid crystal molecules; and
a common electrode between the liquid crystal layer and the second substrate,
wherein:
the first and second domains of the first portion have different alignment directions of the plurality of liquid crystal molecules from each other, and
the third and fourth domains of the second portion have different alignment directions of the plurality of liquid crystal molecules from each other.

10. The display device of claim 9, wherein:
the first horizontal stem is connected to a center of the first vertical stem,
the second horizontal stem is connected to a center of the second vertical stem, and
the first upper branches, the first lower branches, the second upper branches, and the second lower branches extend in an oblique direction with respect to the first direction and the second direction.

11. The display device of claim 8, wherein
the first vertical stem is disposed at a right edge of the first portion, and the second vertical stem is disposed at a left edge of the second portion.

12. The display device of claim 8, wherein
a portion of the first lower branches protrudes out of an imaginary line to which ends of the rest of the first lower branches are aligned in the second direction.

13. The display device of claim 12, wherein
a portion of the second upper branches protrudes out of an imaginary line to which ends of the second upper branches are aligned in the second direction.

14. The display device of claim 8, wherein the display device is a curved display device.

15. The display device of claim 8, further comprising:
a second data line crossing the first gate line,
wherein the first vertical stem is adjacent to one of the first data line and the second data line, and the second vertical stem is adjacent to the other one of the first data line and the second data line.

16. The display device of claim 8, wherein
the first vertical stem is disposed at a first side of the first portion, and the second vertical stem is disposed at a second side of the second portion, the first side opposing the second side.

17. A display device comprising:
a first substrate;
a first gate line disposed on the first substrate;
a first data line crossing the first gate line;
a first thin film transistor connected to the first gate line and the first data line; and
a plurality of pixel electrodes, wherein adjacent pixel electrodes of the plurality of pixel electrodes in a first direction and a second direction in a display area of the first substrate have a same structure as each other,
wherein:
an entire area of the pixel electrode is divided into two portions, which are first portion and a second portion,
the first portion is connected to the first thin film transistor, and has only two domains, which are a first domain and a second domain, the second portion has only two domains, which are a third domain and a fourth domain, the first portion includes:
- a first vertical stem at an edge of the first portion;
- a first horizontal stem connected to the first vertical stem;
- first upper branches, which are disposed in the first domain and extend from the first horizontal stem; and
- first lower branches, which are disposed in the second domain and extend from the first horizontal stem and in a direction different from an extending direction of the first upper branches, and the second portion includes:
- a second vertical stem at an edge of the second portion;
- a second horizontal stem connected to the second vertical stem;
- second upper branches, which are disposed in the third domain and extend from the second horizontal stem; and
- second lower branches, which are disposed in the fourth domain and extend from the second horizontal stem and in a direction different from an extending direction of the second upper branches, wherein the display device further comprises a storage line including an extending portion disposed between the first portion and the second portion, and the storage line is not directly connected to any transistor.

* * * * *